US005574754A

United States Patent [19]
Kurihara et al.

[11] Patent Number: 5,574,754
[45] Date of Patent: Nov. 12, 1996

[54] SLIDING CORRELATOR

[75] Inventors: Takao Kurihara; Yoshitaka Uchida; Masahiro Hamatsu, all of Kohriyama, Japan

[73] Assignee: Clarion Co., Ltd., Tokyo, Japan

[21] Appl. No.: 556,439

[22] Filed: Nov. 9, 1995

Related U.S. Application Data

[63] Continuation of Ser. No. 154,174, Nov. 17, 1993, abandoned.

[30] Foreign Application Priority Data

Nov. 17, 1992 [JP] Japan ..................... 4-331059

[51] Int. Cl.$^6$ ..................................... H04L 7/00
[52] U.S. Cl. ........................... 375/367; 375/208
[58] Field of Search ..................... 375/200, 208, 375/209, 210, 367; 370/107; 380/34, 46

[56] References Cited

U.S. PATENT DOCUMENTS

| | | | |
|---|---|---|---|
| 4,092,601 | 5/1978 | Lee et al. | 325/322 |
| 4,638,494 | 1/1987 | Kartchner et al. | 375/115 |
| 4,649,549 | 3/1987 | Halpern et al. | 380/32 |
| 5,084,913 | 1/1992 | Kingston et al. | 375/115 |
| 5,285,471 | 2/1994 | Kurihara | 375/1 |
| 5,341,404 | 8/1994 | Sevenhans et al. | 375/106 |

FOREIGN PATENT DOCUMENTS 6411178  2/1989  Japan .

OTHER PUBLICATIONS

Stanford Telecom Application Note 106, pp. 7–9 May, 1990.
QualComm's Catalogue, pp. 5–8, For Q 2220.
R. C. Dixon's "Spread Spectrum System" especially pp. 180–185 and pp. 210–212.

Primary Examiner—Stephen Chin
Assistant Examiner—Don Vo
Attorney, Agent, or Firm—Koda and Androlia

[57] ABSTRACT

A sliding correlator for initial synchronization and tracking of a SS (Spread Spectrum)-modulated signal containing a transmitted pseudo noise (PN) code, digitizes the received signal, and attempts to correlate the PN code in the received signal with a locally generated reference PN code. Initial synchronization employs correlation with three reference PN codes, an early, center and late channel. When correlation is found between the transmitted PN code and one of the reference PN codes, the three reference PN codes are shifted to align the center channel with the correlated channel and to displace the early and late channel reference PN codes to one side and the other of the center channel. In one embodiment, the displacement is one-third chip, and in another embodiment, the displacement is one-half chip. In one embodiment for initial tracking, the three channels are displaced one chip from each other and, after failure to attain correlation in any of the channels, the three channels are displaced three chips to again seek synchronization. Initial Tracking, following initial synchronization, detects changes in correlation in the three channels, and adjust the frequency and/or the phase of the three reference PN codes to return the reference PN codes into a desired relationship with the transmitted PN code. In one embodiment of tracking, clockwise and counterclockwise cyclic permutation of the three reference PN codes is used to maintain alignment between the three reference PN codes and the transmitted PN code. In other embodiments, the condition of correlation, or lack thereof, in each channel is stored in a register and shifting of the reference PN codes is performed in response to the status of the register.

24 Claims, 29 Drawing Sheets

Fig., 8A
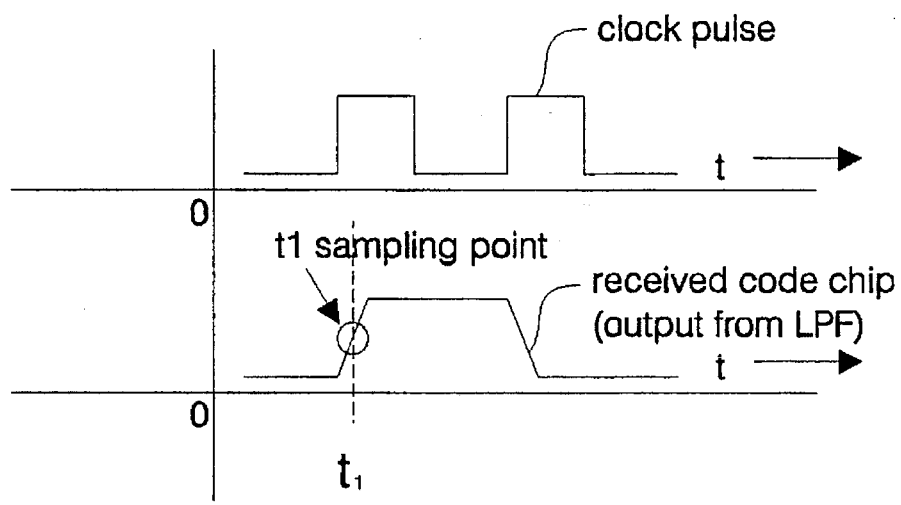
Fig., 8B
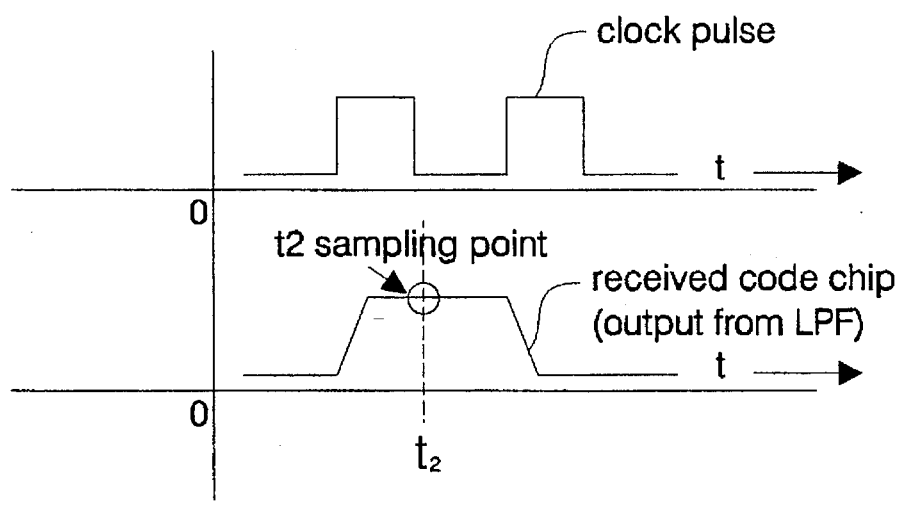

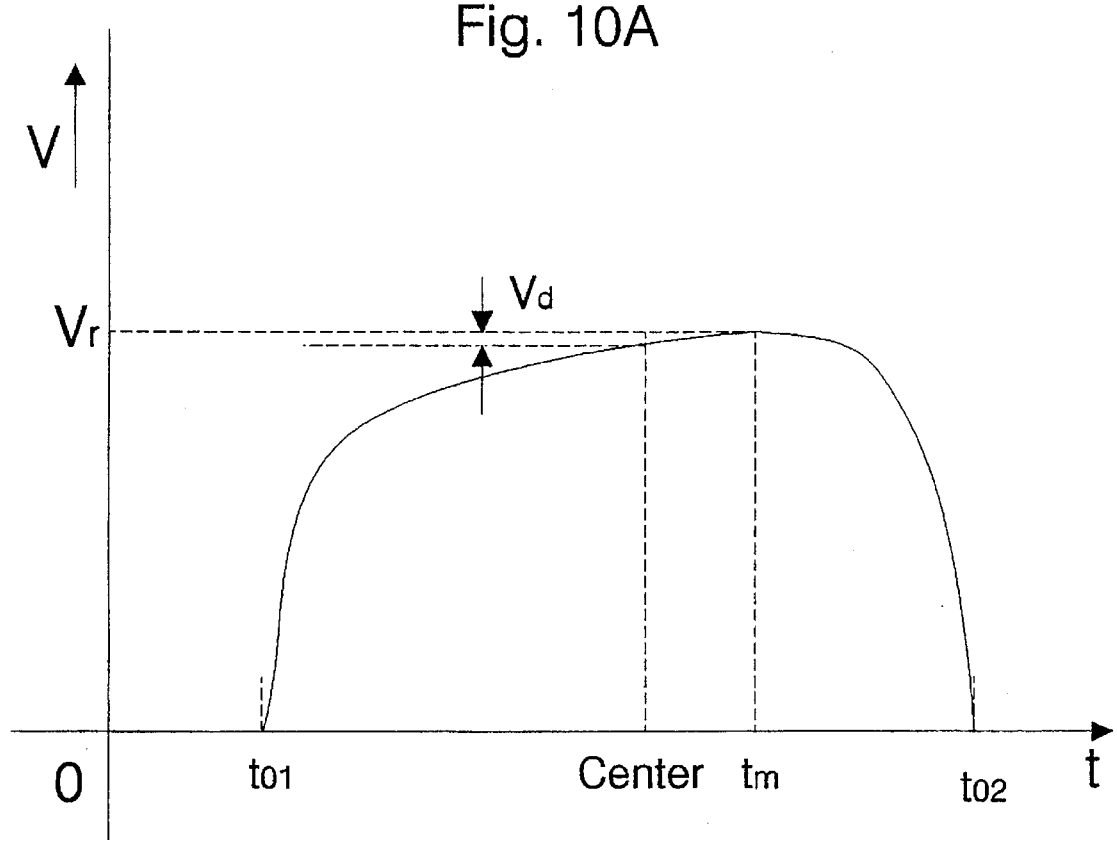

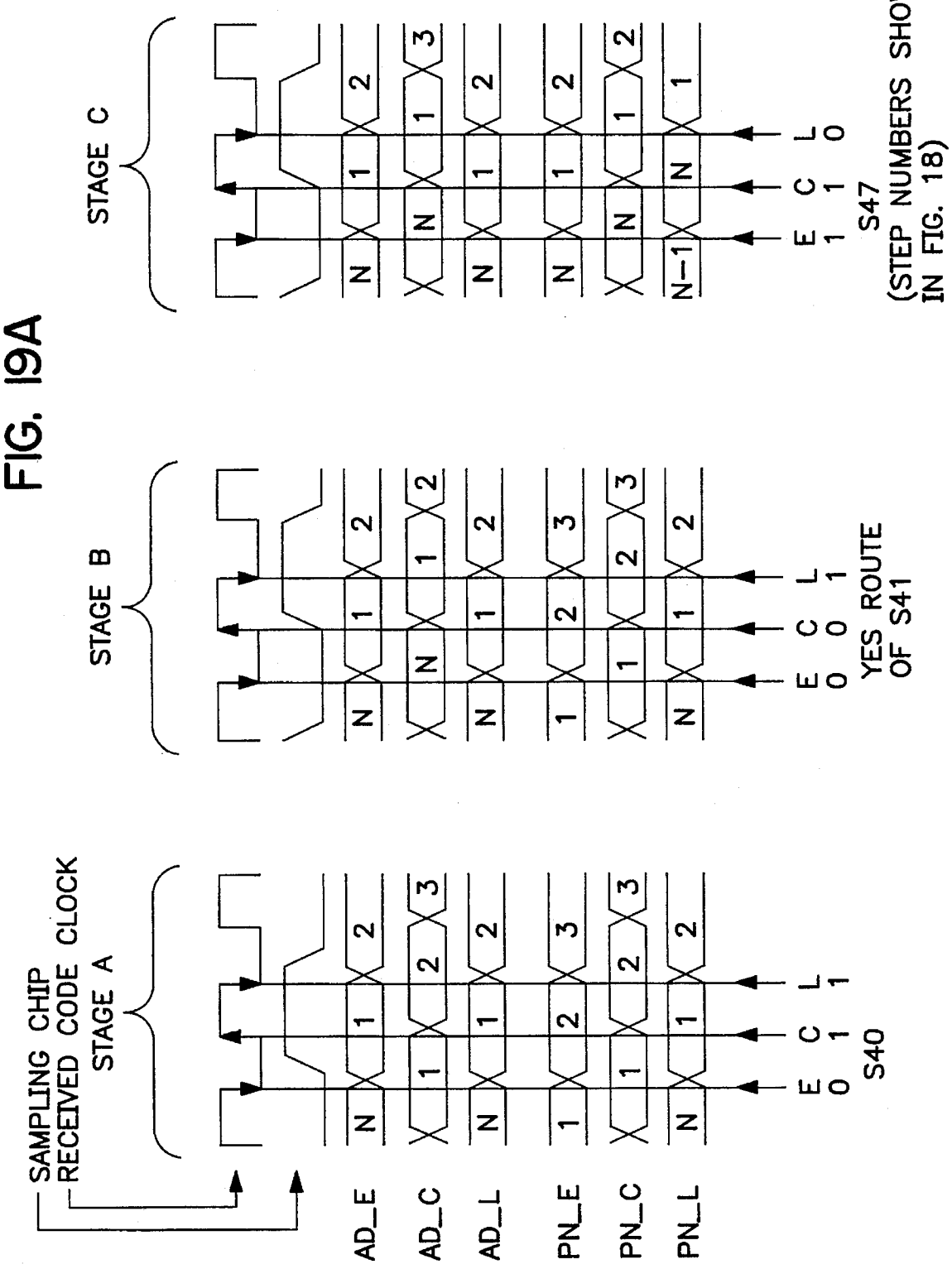

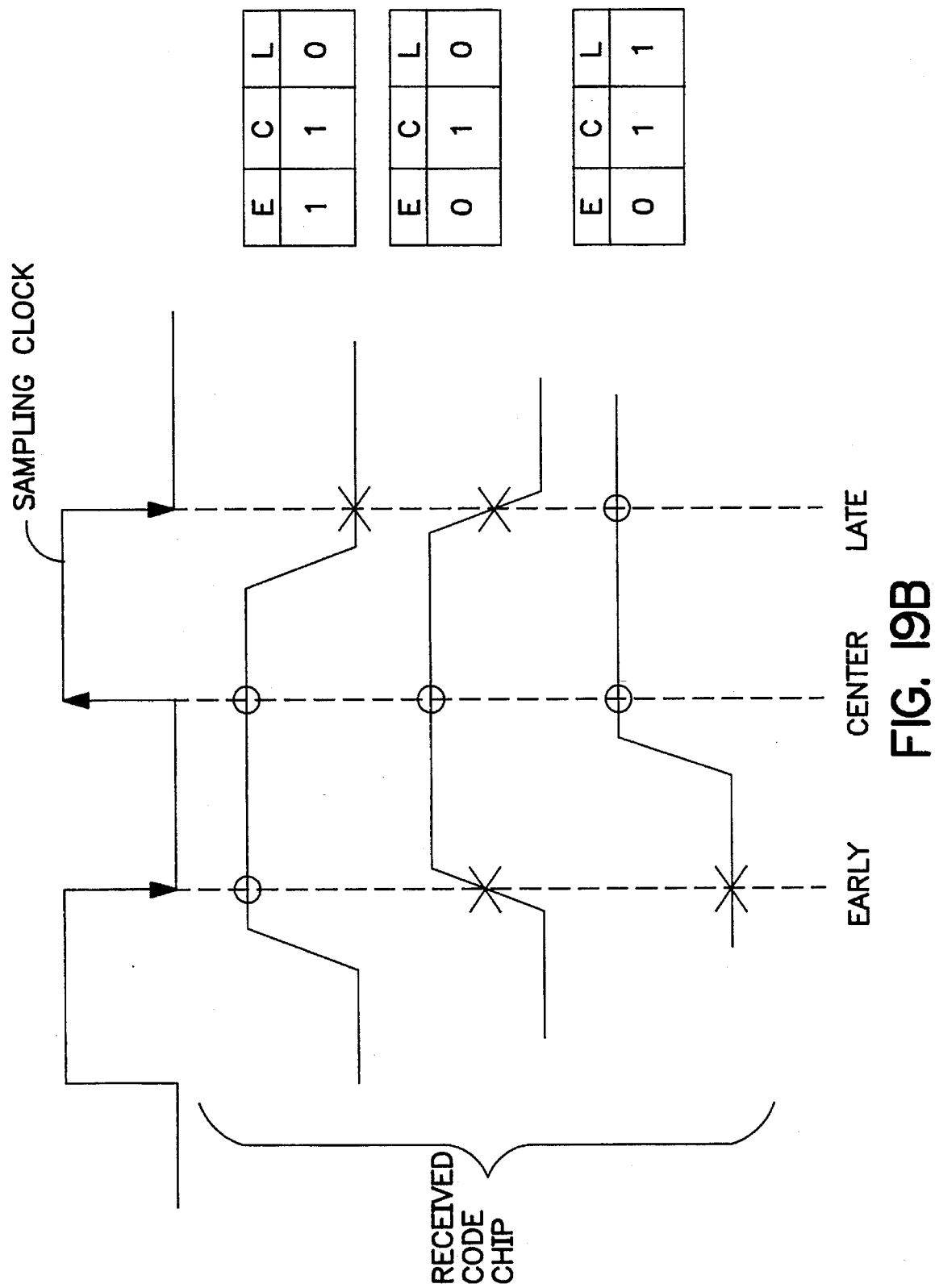

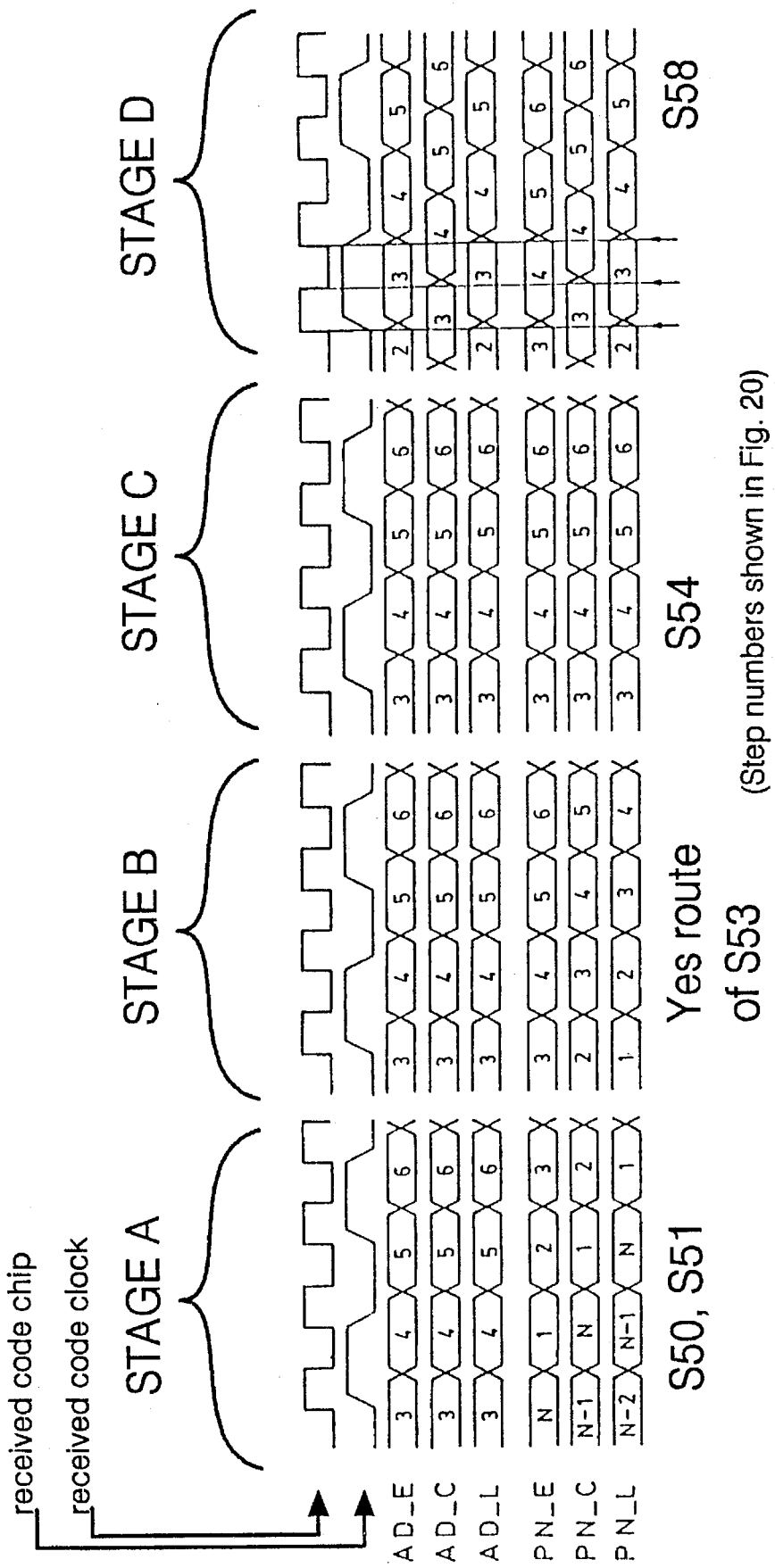

| ST1 | ST0 | MAX. VALUE | CONTROL OF REF. CODE PHASE |
|---|---|---|---|
| 0 | 0 | EARLY | −1 CHIP |
| 1 | 0 | LATE | +1 CHIP |
| X | 1 | CENTER | NOP |

SLIDING CORRELATOR

This is a continuation of application Ser. No. 08/154,174, filed Nov. 17, 1993, now abandoned.

BACKGROUND OF THE INVENTION

The present invention relates to a so-called sliding correlator employable in a receiver of a SSC (Spread Spectrum Communication) system for detecting a correlation between a spreading code included in the received signal and a corresponding code locally-generated in the receiver and, more particularly to correlators employing digital techniques.

Referring now to FIG. 1A, a transmitting unit 100 includes a PN (Pseudo random Noise) generator 3 which produces a PN code for application to a PN modulator 2. A signal containing data to be transmitted, is applied through an input 1 to PN modulator 2. Modulation of the data-containing signal with the PN code produces a spread spectrum communication signal (SSC signal) which has a bandwidth that is several times (at least 10) as wide as the bandwidth of the data-containing signal. The output of PN modulator 3 is applied to an input of a carrier modulator 5. A carrier generator 4 generates a radio-frequency (RF) signal for application to a second input of carrier modulator 5. The carrier RF signal is thus modulated by the SSC signal to produce a broadband signal centered on the frequency of the RF signal. The modulated RF signal is applied to a transmitting antenna 6, from which it is radiated.

In general, the PN signal produced by PN generator 3 appears to be random noise but, in fact, varies in a known repetitive pattern contained in the particular PN code being used. The pattern may be produced as a pattern of frequency changes, phase changes, timing changes, or other techniques which occur at a rate that is rapid compared to the modulation of the data signal entering at input 1. To a receiver that lacks knowledge of the PN code, the transmitted signal appears indistinguishable from noise. To a receiver having knowledge of the PN code, the repetitive nature of the PN code can be used to reconstruct the original signal.

Referring now to FIG. 1B, a receiving unit 200 includes a receiving antenna 7 for receiving the SSC signal transmitted from transmitting antenna 6 (FIG. 1A). The received signal is applied to an input of a correlator 8. A reference PN generator 9 produces a PN code for application to a second input of correlator 8. An output of correlator 8 is applied to an input of a demodulator 10. Demodulator 10, which contains a local oscillator and mixer (not shown) produces an output 11 which, upon the meeting of certain conditions, contains only the data which was applied to input 1 of FIG. 1a.

The conditions for correct demodulation of the data from the received signal require correlation between the PN code in the received signal and the PN code generated by reference PN generator 9. That is, the conditions are:

1. The PN code generated by reference PN generator 9 must be the same as the PN code generated by PN generator 2, and 2. The two PN codes must be aligned in time.

When these conditions are met, correlator 8 removes the PN code from the received signal to produce a result that is the same as would have been created if the data signal modulated the carrier frequency, without the additional modulation by the PN code. Demodulator 10 thus performs conventional demodulation of the signal it receives to extract the data contained in the signal.

There are two well-known conventional techniques for determining the correlation between the PN code in the received signal and the reference PN code generated in receiving unit 200. These techniques are the matched filter method and the sliding correlation method.

Japanese Patent Publication SHO64-11178, Japanese Patent Provisional Publication SHO58-131840 disclose the matched filter method. In the matched filter method, the received signal, containing the PN code plus the data, and the reference PN code are fed into a matched filter such as, for example, a convolver. In the convolver, the received and reference PN codes are compared with each other. The convolver generates a pulse signal based upon the coincidence of the PN codes, and on the degree of correlation between them.

The sliding correlation method employs a sliding correlator in receiving unit 200 for generating pulse signal having an amplitude depending on the degree of correlation between the PN codes. The sliding correlator adjusts the frequency, phase or timing of the reference PN code to maximize the amplitude of the pulse signal.

Referring to FIG. 2, a sliding correlator, employs a so-called delay-lock method in which the frequency of the reference PN code is adjusted to align the phase of the reference PN code with the phase of the PN code in the received signal.

The input signal from receiving antenna 7 is fed inputs of a pair of multipliers 12, 13. PN generator 3 contains a voltage controlled oscillator (VCO) 18 feeding a signal to a PN generator 19. The output of PN generator 19, PN1, is fed directly to a second input of multiplier 13. The output of PN generator 19 is delayed for a time "T" equal to half of a "chip" of the PN code in a delay circuit 20 to produce a delayed PN signal PN2 for application to a second input of multiplier 12. A chip is defined as a signal frequency output from a frequency hopping signal generator. Chip time signifies the time occupied by that single frequency. Chip time also signifies the period of a code clock.

The output of multiplier 12 is applied to an input of an envelope detector 14. Similarly, the output of multiplier 13 is applied to an input of an envelope detector 15. The output of envelope detector 14 is applied to a + input of a comparator 16. The output of envelope detector 15 is applied to a − input of comparator 16. The output of comparator 16 is applied to modulator 10 (FIG. 1B) and to an input of a loop filter 17. Loop filter 17 filters out the AC component in the signal at its input, and applies the remaining DC component in its input to a control input of VCO 18.

Referring now to FIG. 3, in general, one PN code consists of thirty one (31) chips. Output 1 of envelope detector 14 is defined as a "lagging" output, since it relies for detection on the delayed PN code PN2. Similarly, output 2 of envelope detector 15 is defined as a "leading" output, since it relies for detection on the undelayed PN code PN1. Output 1, as shown in FIG. 3, represents the output of envelope detector 14 as the phase of a chip of PN code passes through correlation with the delayed PN code PN2. Similarly, output 2 represents the output of envelope detector 15 as the PN code passes through correlation with undelayed PN code PN1. The output of comparator 16 is:

$$Vc = V2 - V1$$

Where:

V2=Amplitude of output 2 and

V1=Amplitude of output 1

When V2=V1=0, the PN code in the received is canceled at the output of comparator 16. The remaining signal includes only the original carrier signal plus the data signal.

The outputs of comparator 16 passes though a positive peak when output 1 passes through its peak, then through zero as outputs 1 and 2 pass though equality, and then through a negative peak as output 2 passes through its positive peak. It will be recognized that the DC component in the filtered output of comparator 16, when applied to VCO 18, will control the frequency and phase of VCO 18 to maintain the output of comparator 16 at a center frequency or tracking point approximately equal to zero. That is, the two components of the received PN code are subtracted from each other, leaving only the carrier and data signal for connection to demodulator 10. This is the point of correlation of the reference PN code and the PN code in the received signal.

Correlation by correlator 8 proceeds in two steps. First, when the correlation value, representing the degree of the coincidence between the received PN code and the reference PN code reaches a certain threshold value, a synchronizing state is established, in which the frequency of the reference PN code is approximately equal to the received PN code. In the next step, a tracking operation adjusts the phase of the reference PN code to a value, as described above, which is effective to cancel the PN code in the received signal, and to thus provide the carrier and data signals for final detection. The principle of the delay-lock method of correlation is described in detail in "Spread Spectrum System" written by R. C. Dixon and published by WILEY-INTERSCIENCE PUBLICATION.

The above-described sliding correlator is especially adapted for use with analog circuits including filters, amplifiers, and multipliers. However, techniques for fabricating semiconductor devices have improved to the point where elements for processing digital signals can be fabricated at low cost. The cost advantage, as well as opportunities for miniaturization and automated volume production, offered by digital techniques are such that it may be preferable to employ digital techniques in the correlator.

Digitized VCOs, such as, for example, an NCO (Numeral Controlled Oscillator), or a DDS (Direct Digital Synthesizer) may be used to control a correlator. However, such digital VCOs conventionally employ relatively long digital words, of perhaps 23 bits, for their control. Such long digital words undesirably increases the size of the correlator device.

OBJECTS AND SUMMARY OF THE INVENTION

It is an object of the invention to provide a correlator which overcomes the drawbacks of the prior art.

It is a further object of the invention to provide a correlator using digital technique that does not require a digitized VCO.

Briefly stated, the present invention provides a sliding correlator for initial synchronization and tracking of a SS (Spread Spectrum)-modulated signal containing a transmitted pseudo noise (PN) code, which digitizes the received signal, and attempts to correlate the PN code in the received signal with a locally generated reference PN code. Initial synchronization employs correlation with three reference PN codes, an early, center and late channel. When correlation is found between the transmitted PN code and one of the reference PN codes, the three reference PN codes are shifted to align the center channel with the correlated channel and to displace the early and late channel reference PN codes to one side and the other of the center channel. In one embodiment, the displacement is one-third chip, and in another embodiment, the displacement is one-half chip. In one embodiment for initial tracking, the three channels are displaced one chip from each other and, after failure to attain correlation in any of the channels, the three channels are displaced three chips to again seek synchronization. Initial Tracking, following initial synchronization, detects changes in correlation in the three channels, and adjust the frequency and/or the phase of the three reference PN codes to return the reference PN codes into a desired relationship with the transmitted PN code. In one embodiment of tracking, clockwise and counterclockwise cyclic permutation of the three reference PN codes is used to maintain alignment between the three reference PN codes and the transmitted PN code. In other embodiments, the condition of correlation, or lack thereof, in each channel is stored in a register and shifting of the reference PN codes is performed in response to the status of the register.

According to an embodiment of the invention, there is provided a sliding correlator comprising: means for detecting a sine component and a cosine component of an input signal, means for digitizing the sine and cosine components to produce sine and cosine digitized components, means for generating a reference PN code, means for determining a correlation between sine and cosine components of the reference PN code and each of the sine and cosine digitized components, means for generating a clock signal for use in the means for digitizing and means for generating a reference PN code, and means for controlling at least one phase of the clock signal to produce an output signal in accordance an output of the means for determining a correlation.

According to a feature of the invention, there is provided apparatus for initial synchronization of a signal containing a transmitted PN code, and a reference PN code, comprising: means for generating first, second and third reference PN codes, the first, second and third reference PN codes including the transmitted PN code, the first, second and third reference PN codes being displaced from each other, means for detecting a first condition of correlation between the transmitted PN code and a correlated one of the first, second and third of the reference PN codes, means, responsive to the first condition of correlation, for shifting the second reference PN code to a value equal to the correlated one, means for shifting the first reference PN code a predetermined amount in a first direction from the value, and means for shifting the second reference PN code the predetermined amount in a second direction from the value, whereby tracking is enabled.

According to a further feature of the invention, there is provided apparatus for tracking a transmitted PN code with a reference PN code, comprising: means for producing first, second and third reference PN codes displaced a predetermined amount from each other, means for detecting first, second and third correlation signals relating to a degree of correlation between the transmitted PN code and the first, second and third reference PN codes, respectively, and means for adjusting at least one of a frequency and a phase of the first, second and third reference PN codes to generally track the transmitted PN code.

According to a still further feature of the invention, there is provided apparatus for tracking a transmitted PN code with a reference PN code comprising: the transmitted PN code including at least one chip, means for producing first, second and third reference PN codes, the first reference PN code being displaced one chip in a first direction from the second reference PN code, the third reference PN code being displaced one chip in a second direction from the second reference PN code, means for detecting a correlation between the transmitted PN code and the first, second and third reference PN codes to produce first, second and third correlation signals, respectively, means responsive to an amplitude of the first correlation signal exceeding the second correlation signal for shifting the first, second and third reference PN codes a predetermined fraction of a chip in the first direction, and means responsive to an amplitude of the second correlation signal exceeding the second correlation signal for shifting the first, second and third reference PN codes the predetermined fraction of a chip in the second direction.

According to another feature of the invention, there is provided apparatus for initial synchronization of a reference PN code with a transmitted PN code, comprising: the transmitted PN code including a plurality of chips, the reference PN code including N reference PN codes displaced predetermined amounts from each other, means for detecting correlation between each of the N reference PN codes and the transmitted PN code, means for shifting the N reference PN codes an amount equal to N chips, in the event that correlation is not detected, and means responsive to detection of correlation between one of the N reference PN codes and the transmitted PN code for shifting a center one of the N reference PN codes to a value equal to the one, and for shifting all of the N reference PN codes on a first side of the one to spaced-apart conditions on one side of the one, and for shifting all of the N reference PN codes on another side of the one to spaced apart conditions on the another side of the one.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 8A and 8B are waveforms to which reference will be made in describing the sampling operation on a received PN code chip.

FIG. 10A shows one example of an actual waveform of an output of a low pass filter of FIG. 4.

FIG. 19A shows a timing chart of the tracking operation shown in FIG. 18.

FIG. 19B shows a timing chart for illustrating examples of status to be stored in a status storing memory within the tracking operation circuit.

FIG. 21 shows a timing chart of the initial synchronization shown in FIG. 20.

DETAILED DESCRIPTION OF THE PREFERRED EMBODIMENTS

Figure 4:
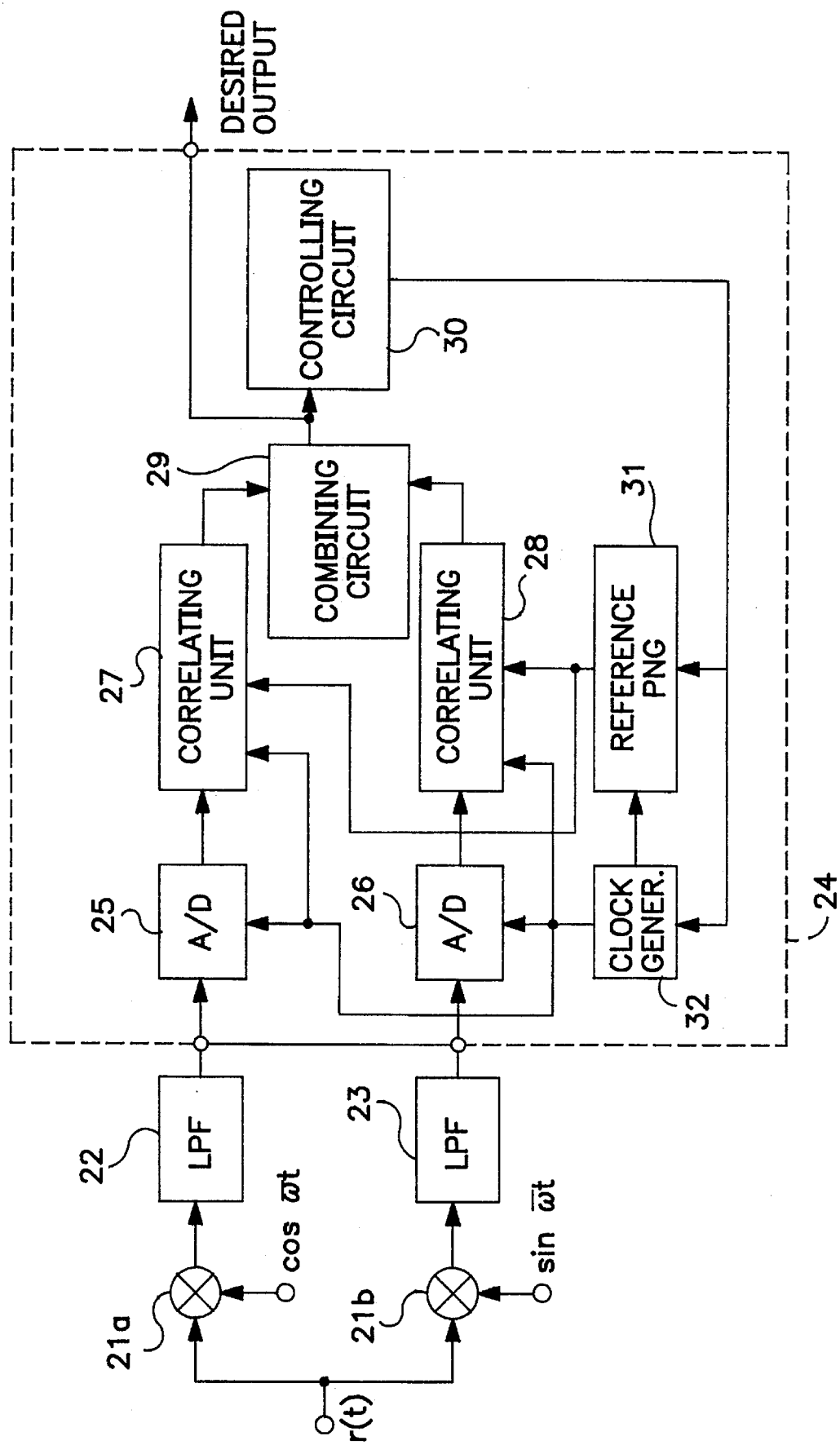
FIG. 4 shows a block diagram of a sliding correlator according to an embodiment of the present invention.

Referring to FIG. 4, a sliding correlator 24' is of a type especially adaptable to demodulate an SS (Spread Spectrum)-modulated signal and, especially, a BPSK (Bi-Phase Shift Keying)-modulated signal.

In general, a SS-BPSK signal is defined by the following equation;

$$r(t) = \{f(t) \oplus PN(t)\} \cos \omega t \qquad (1)$$

where:
f(t): digital data, i.e., "1" or "0";
PN(t): PN code;
$\oplus$: Exclusive OR; and cosωt: Carrier signal.

The signal r(t) is applied in parallel to inputs of first and second multipliers 21A and 21B. The signal r(t) can be at the frequency of the received signal, or it may be at a frequency shifted upward or downward from the received frequency, by conventional methods. A reference signal cosωt is applied to a second input of multiplier 21A. A reference signal sinωt (90 degrees out of phase with the reference signal cosωt) is applied to a second input of multiplier 21B. The angular frequency ω of the two reference signals is initially approximately equal to the angular frequency ω of the signal r(t). The outputs of multipliers 21A and 21B are the "cosine" and "sine" components, respectively, of the input signal r(t), with the phase relationships of these components preserved.

The output of multiplier 21A is applied to a low-pass filter 22 which removes high-frequency noise components, and switching transients. The cut-off frequency of low-pass filter 22 (23) is the equal to the clock frequency of the PN code. The output of low-pass filter 22 is applied to an input of an analog to digital converter 25 in a correlation system 24. The digital output of analog to digital converter 25, containing each chip in the received PN code, as well as lower-frequency carrier and data signals, is applied to an input of a correlating unit 27. A reference PN code generator 31 applies a reference PN code to a second input of correlating unit 27. An output of correlating unit 27 is applied to one input of a combining circuit 29. The output of combining circuit 29, representing the desired output of sliding correlator 24', is connected to external circuits, and is applied to an input of a controlling circuit 30. The output of controlling circuit 30 is applied in parallel to a reference PN code generator 31, and to a clock generator 32.

The output of multiplier 21B is applied through a low pass filter 23 to an analog to digital converter 26, whose output, in turn, is applied to a correlating unit 28. The output of correlating unit 28 is applied to a second input of combining circuit 29.

A clock output of clock generator 32 is applied in parallel to second inputs of analog to digital converters 25 and 26 to drive the digitizing processes therein and to the PN code generator 31. The reference PN code from reference PN code generator 31 is applied in parallel to second inputs of correlating units 27 and 28. In addition, the clock output of clock generator 32 is applied in parallel to correlating units 27 and 28 to control the operation of correlating units 27 and 28, as will be described.

Figure 1A:
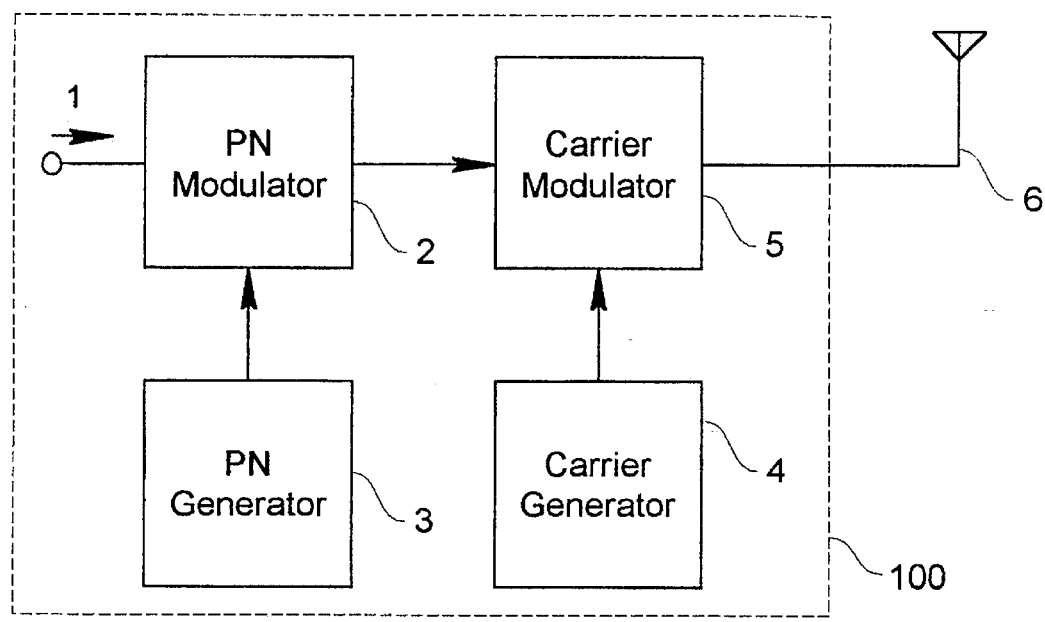
FIG. 1A is a block diagram of an SSC transmitting unit according to the prior art.
Figure 1B:
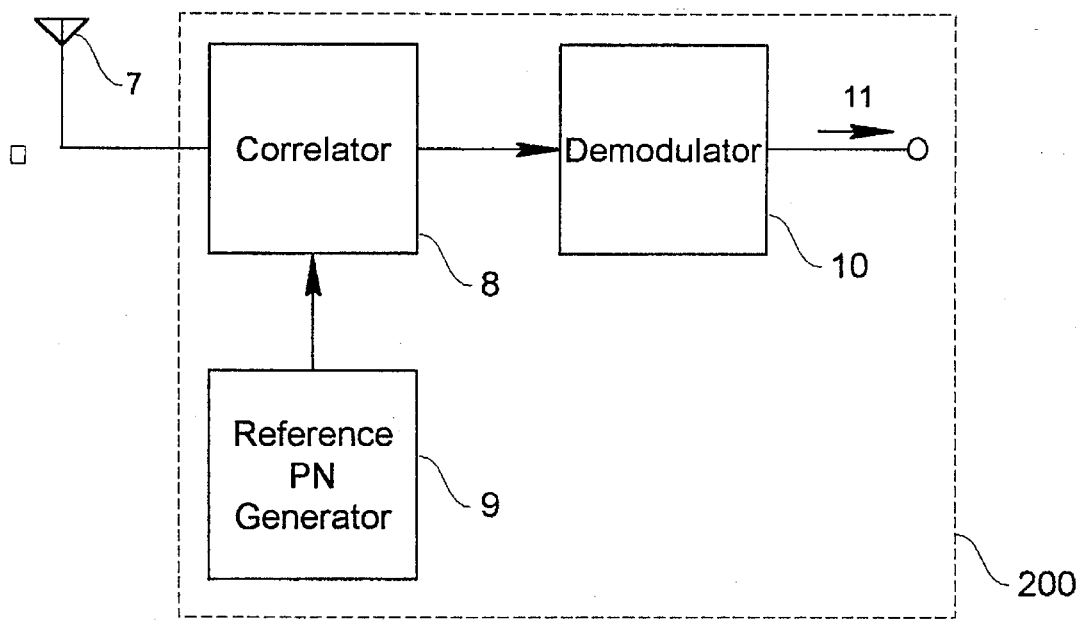
FIG. 1B is a block diagram of an SSC receiving unit according to the prior art.
Figure 2:
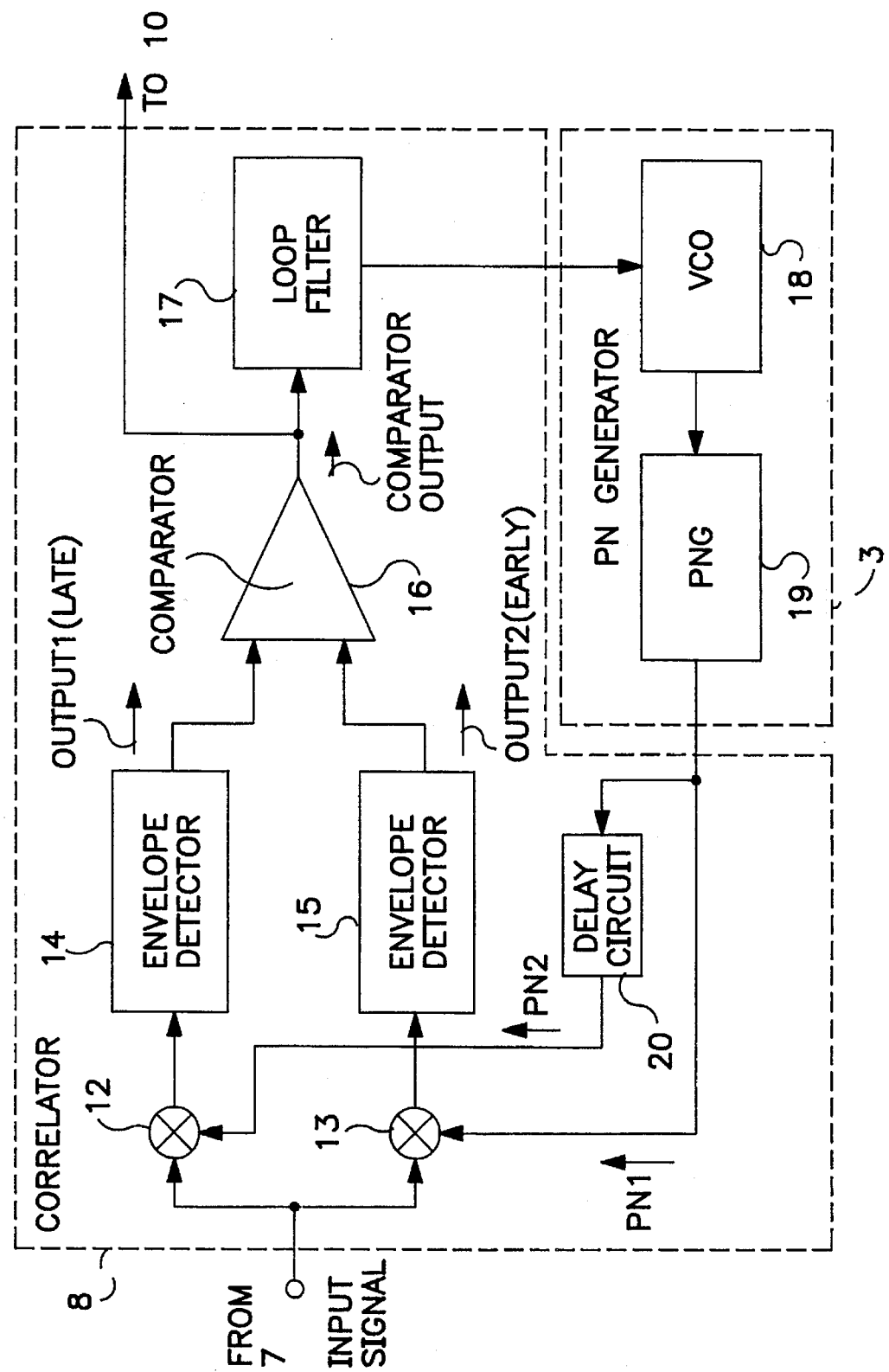
FIG. 2 shows a block diagram of a conventional sliding correlator.
Figure 3:
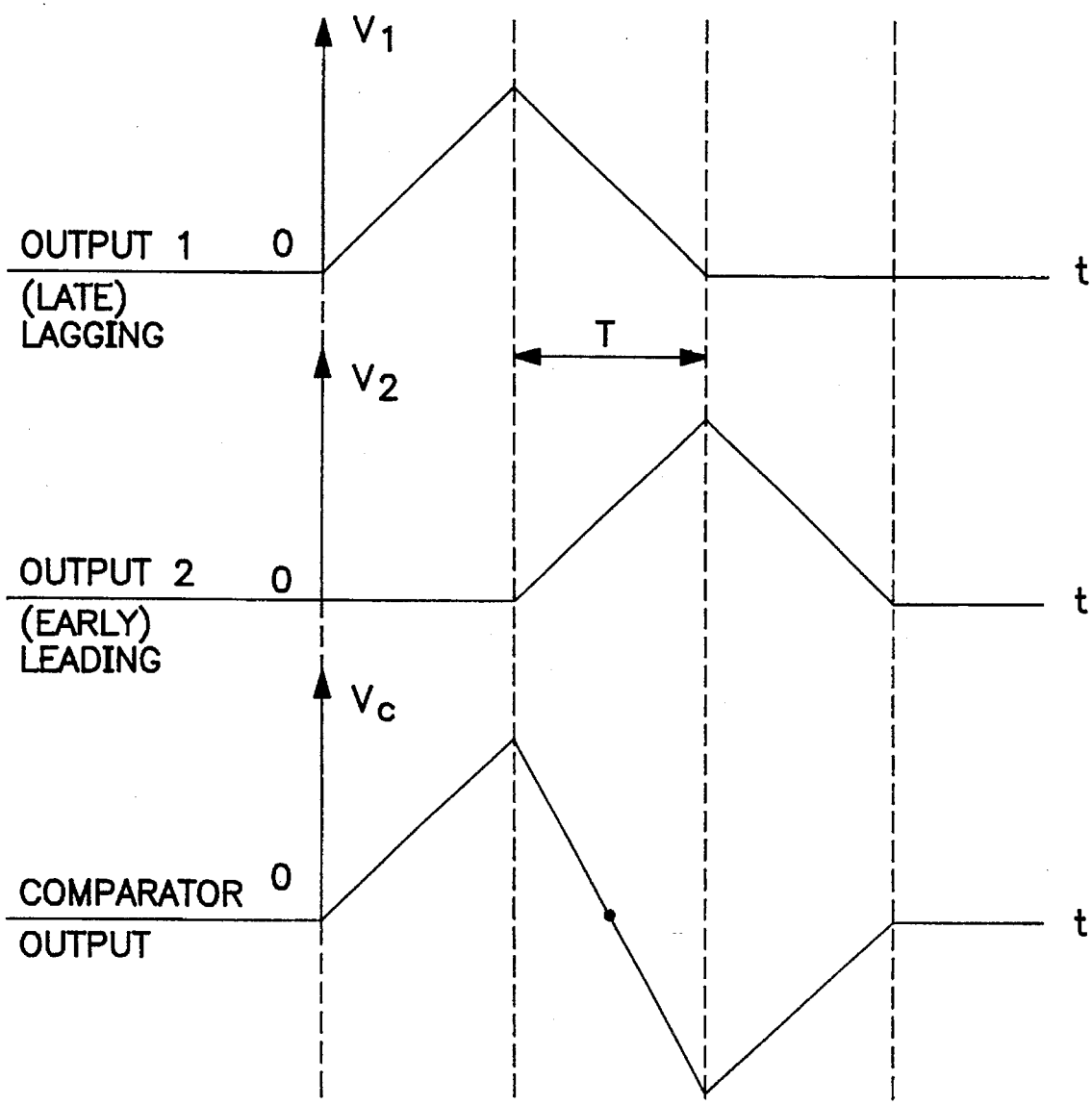
FIG. 3 shows waveforms appearing at certain points in the sliding correlator of FIG. 2.

The outputs of correlating units 27 and 28 are digital words responsive, respectively, to the degree of correlation between the sine and cosine components of the PN code in the input signal r(t) and the reference PN code applied thereto. The output of combining circuit 29 is a digital value responsive to the difference between the sine and cosine components of the input signal r(t). Controlling circuit 30 performs a filtering function on the flow of digital values it receives corresponding to the filtering function performed by loop filter 17 of FIG. 2, to produce a digital output for controlling the frequency and phase of reference PN code generator 31 and clock generator 32, to bring the frequency and phase of the outputs of these elements into synchronism with the received PN code.

Figure 5:
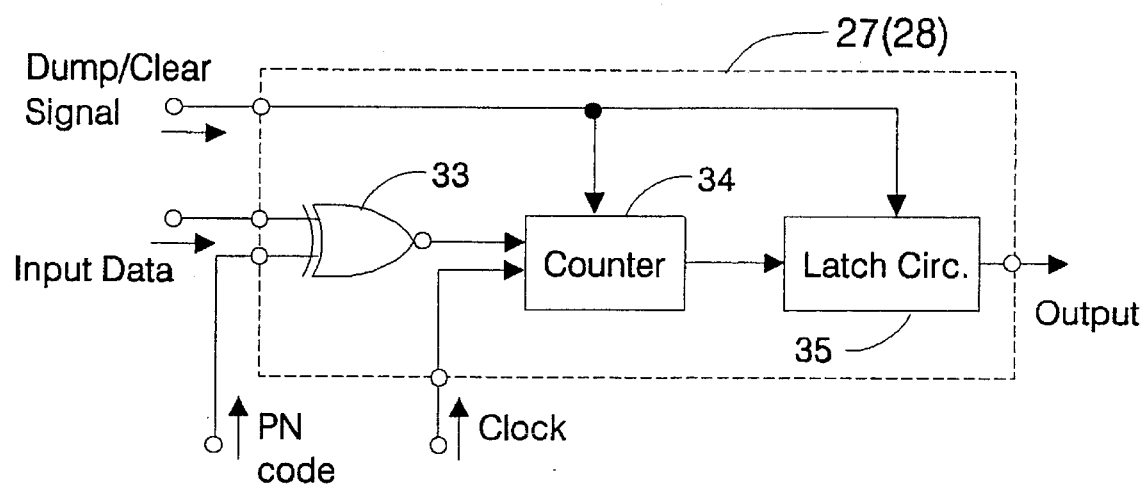
FIG. 5 shows a block diagram of a correlating unit in the correlator of FIG. 4.

Referring now to FIG. 5, correlating unit 27 (28) includes an exclusive-NOR gate 33 receiving the input data from analog to digital converter 25 at one input, and the reference PN code at a second input. As is characteristic of an exclusive-NOR gate, exclusive-NOR gate 33 produces a "1" output only when its inputs are the same (that is, either 0 0, or 1 1), and produces a "0" output at all other times. The output of exclusive-NOR gate 33 is applied as an enable input to a counter 34. A high frequency clock signal which may be, for example, the clock signal from clock generator 32 (FIG. 4), is applied to a second input of counter 34. The digital content of counter 34 is applied to an input of a latch circuit 35. A dump/clear signal, occurring once each predetermined number of clock pulses, is applied to inputs of counter 34 and latch circuit 35. Each time the dump/clear signal occurs, the content of counter 34 is latched into latch circuit 35, and then counter 34 is reset in preparation for the next counting cycle. Between the occurrences of the dump/clear signal, the digital output of latch circuit 35 remains constant at the value existing in counter 34 at the most recent occurrence of the dump/clear signal.

Returning now to FIG. 4, the digital outputs of correlating units 27 and 28, generated in the manner described above, are connected to inputs of combining circuit 29, wherein, at the occurrence of each dump/clear signal, they are subtracted from each other, and the difference, a positive or negative digital number, is applied to controlling circuit 30.

Figure 6:
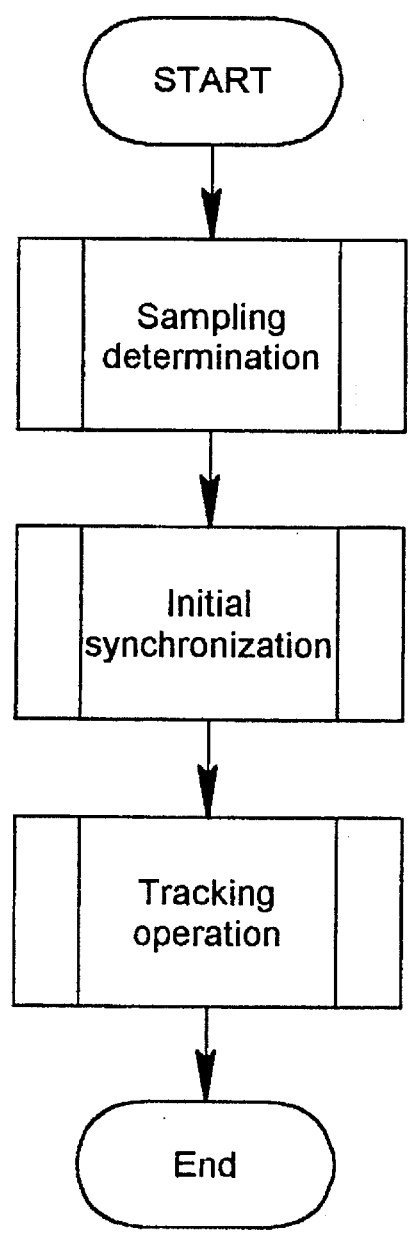
FIG. 6 shows a flow chart illustrating operation of the correlator of the present invention.

Referring now to FIG. 6, the general flow of operation of the correlator of the present invention is 1) sample the data, 2) establish initial frequency synchronization and 2) perform tracking to align phases of the received and the reference PN codes.

Figure 7A:
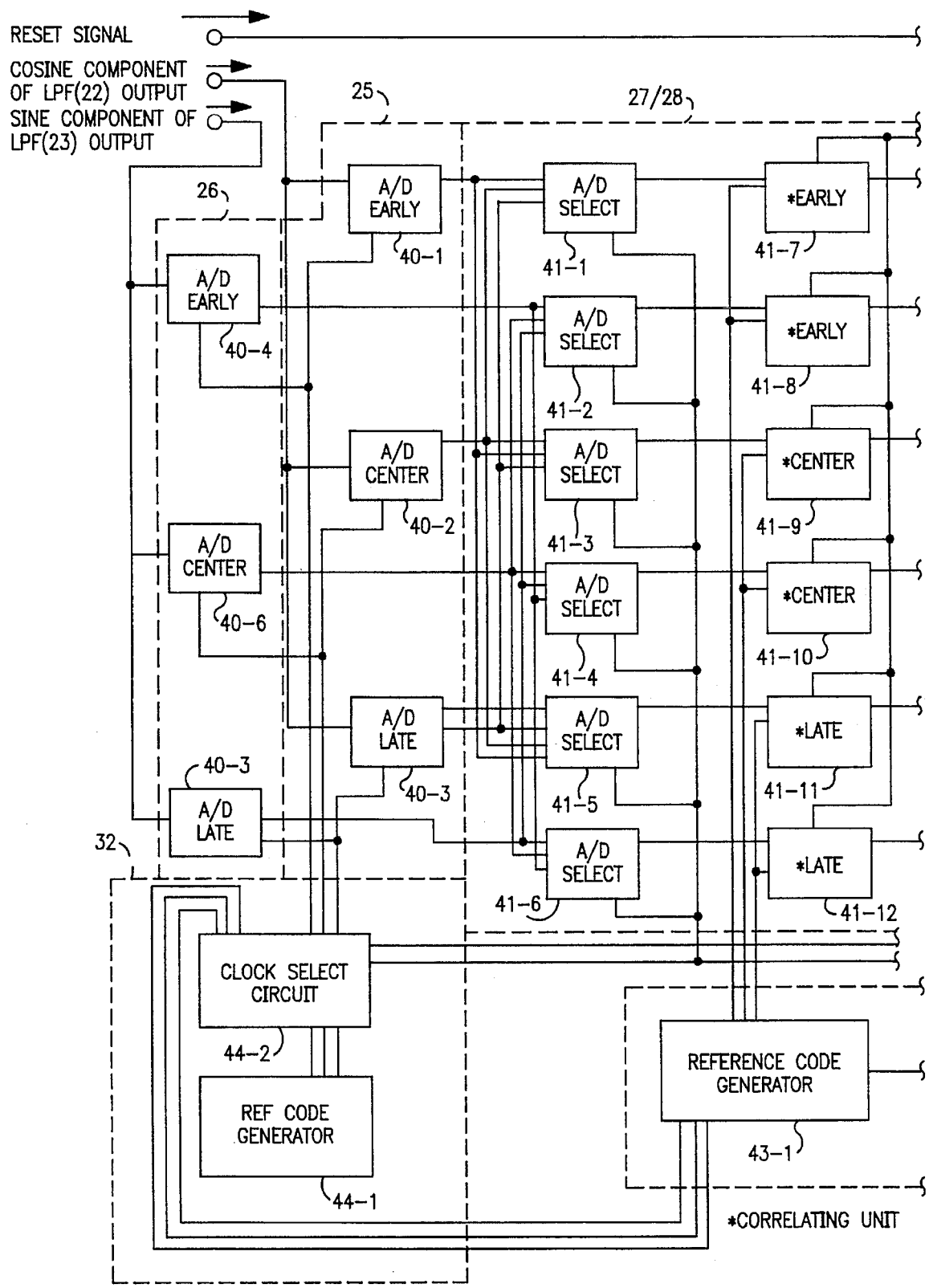
FIG. 7 shows a detailed block diagram of the sliding correlator of FIG. 4.
Figure 7B:
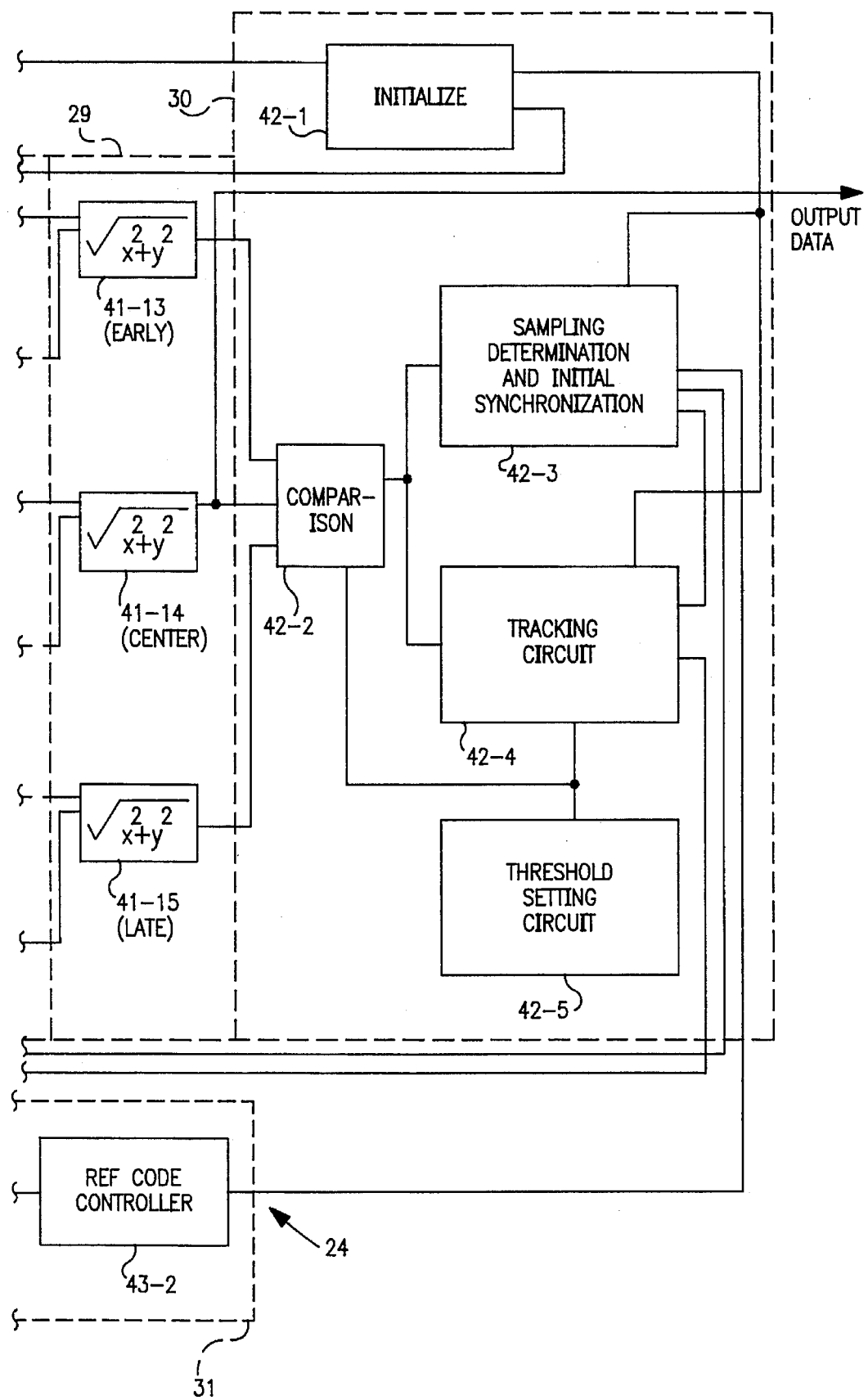

Referring now to FIG. 7, there is shown, in greater detail, correlation system 24 of FIG. 4. Analog to digital converters 25 and 26, together include analog to digital converters 40-1 to 40-6. Analog to digital converters 40-1 to 40-3 process "early", "center" and "late" signal components of the cosine component of the signal from low pass filter 22. Analog to digital converters 40-4 to 40-6 similarly process sine components of the signal from low pass filter 23.

Correlating units 27/28 include analog to digital data select circuits 41-1 to 41-6, correlating units 41-7 to 41 - 12 and calculation circuits 41-13 to 41-15.

Data select circuit 41-1 to 41-6 select one of the early, center or late data outputs, in sine and cosine components for the initial synchronization described later.

Correlating units 41-7 to 41-12 take the correlation between the data selected by the analog to digital data select circuits 41-1 to 41-6 and the data included in PN code output from reference PN code generator 31.

Calculation circuits 41-13 to 41-15 calculate the absolute value of the correlated output. The correlated output is represented by real and imaginary components making up a conventional complex number. Calculation circuits 41-13 to 41-15 obtain the absolute value of the correlated output of the early, center and late data. The value "x" in the equations in FIG. 7 represents the real part of the correlated output, i.e., cosine component of the correlated output signal. The value "y" represents the imaginary part, i.e., sine component.

Controlling circuit 30 includes an initializing circuit 42-1 receiving a conventional reset signal, generated by a conventional controller, not shown. An output of initializing circuit 42-1 is applied to inputs of a sampling determination and initial synchronization circuit 42-3 and tracking circuit 42-4. In addition, an output of initializing circuit 42-1 is applied to inputs of correlating unit 41-7 to 41-12. A comparison circuit 42-2 compares the absolute values calculated by the calculation circuits 41-13 to 41-15 with a threshold level generated by a threshold level setting circuit 42-5 to determine the a minimum signal lever below which incoming data is ignored. That is, comparison circuit 42-2 enable transmission of data therethrough only when the incoming data exceeds the threshold established by threshold setting circuit 42-5.

Reference PN code generator 31 includes reference code generating circuit 43-1 for generating the reference PN code. This circuit outputs three PN codes having phases corresponding to the phase positions of early, center and late signals. A reference code controlling circuit 43-2 controls reference code generating circuit 43-1 to produce the desired PN code in response to the signal from the controlling circuit 30.

Clock generator 32 including a clock generating circuit 44-1 for generating early, center and late reference clock signals. A clock select circuit 44-2 selects the early, center or late reference clock signal for application to appropriate elements in analog to digital converters 25 and 26.

In the sliding correlator according to the present invention, each of steps shown in FIG. 6, that is, the sampling determination, initial synchronization and tracking operation, are performed in the following manner.

(1) sampling determination

Referring now to FIG. 8A, correct sampling requires a that a certain minimum signal level be present in the output of the low pass filter. At a sampling time t 1, the received and filtered chip level is below its maximum value, and therefore sampling cannot be done satisfactorily.

Referring now to FIG. 8B, if sampling is performed at a time t2, the received and filtered chip level has reached its maximum level, and sampling can be done successfully.

Figure 9A:
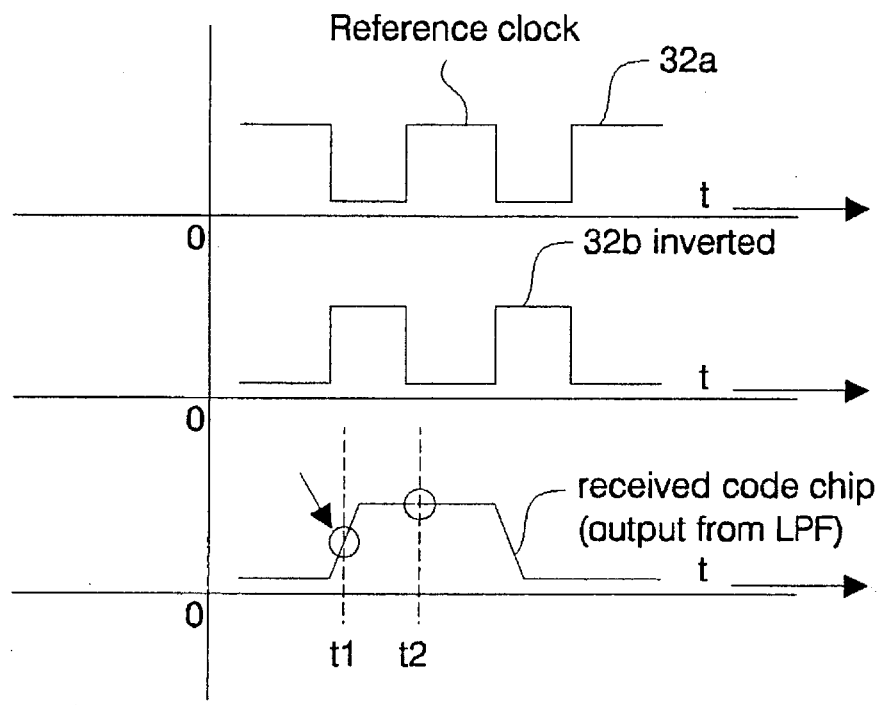
FIGS. 9A and 9B show waveforms illustrating relationships between reference clock and the received PN code chip.

Referring now to FIG. 9A, initial sampling determination determines the time at which sampling will be done and initial synchronization will be done. A reference clock 32a triggers a sampling determination test on each of its rising edges (at time t2 in the illustration). An inverted reference clock 32b also triggers a sampling determination test one each of its rising edges (at time t1 in the illustration). As previously described, at time t1, the received chip has insufficient amplitude for sampling, but at time t2, the full-amplitude chip has sufficient amplitude. Thus, in the situation shown, the system uses inverted clock 32b to begin initial synchronization, since it has been determined that the amplitude of the received chip is higher at sampling time t2, than it is at sampling time t1.

One skilled in the art can see from FIG. 9A that it is possible for the received chip to be aligned such that both reference clock 32a and inverted reference clock 32b occur during the maximum of the received chip. In this case, either the direct or inverted reference clock 32a/32b may be used for determining the sampling and initial synchronization. If the data occurring a time t2 is used, the sampling time for the received code chips so defined can be used to control the frequency of the reference PN code generator and thus begin to align the frequency and phase of the reference PN code with the PN code in the received signal.

Referring now to FIG. 10A, the actual shape of a chip emerging from an analog to digital converter has certain characteristics which are different from the idealized values shown in prior drawings. The actual shape has a maximum amplitude Vr that occurs at a time tm, which is offset from the center CTR of the chip, occurring at a time midway between the extremes t01 and t02 of the response to the chip. At the center CTR, the amplitude of the signal is lower by an amount Vd than the maximum amplitude Vr. These characteristics thus could give rise to offset error and gain error in synchronization and tracking. In addition, quantizing errors are produced by a finite word size in the analog to digital converters. These errors, and their effects are well understood and can be compensated by conventional means. Thus further discussion of such errors is omitted.

Figure 10:
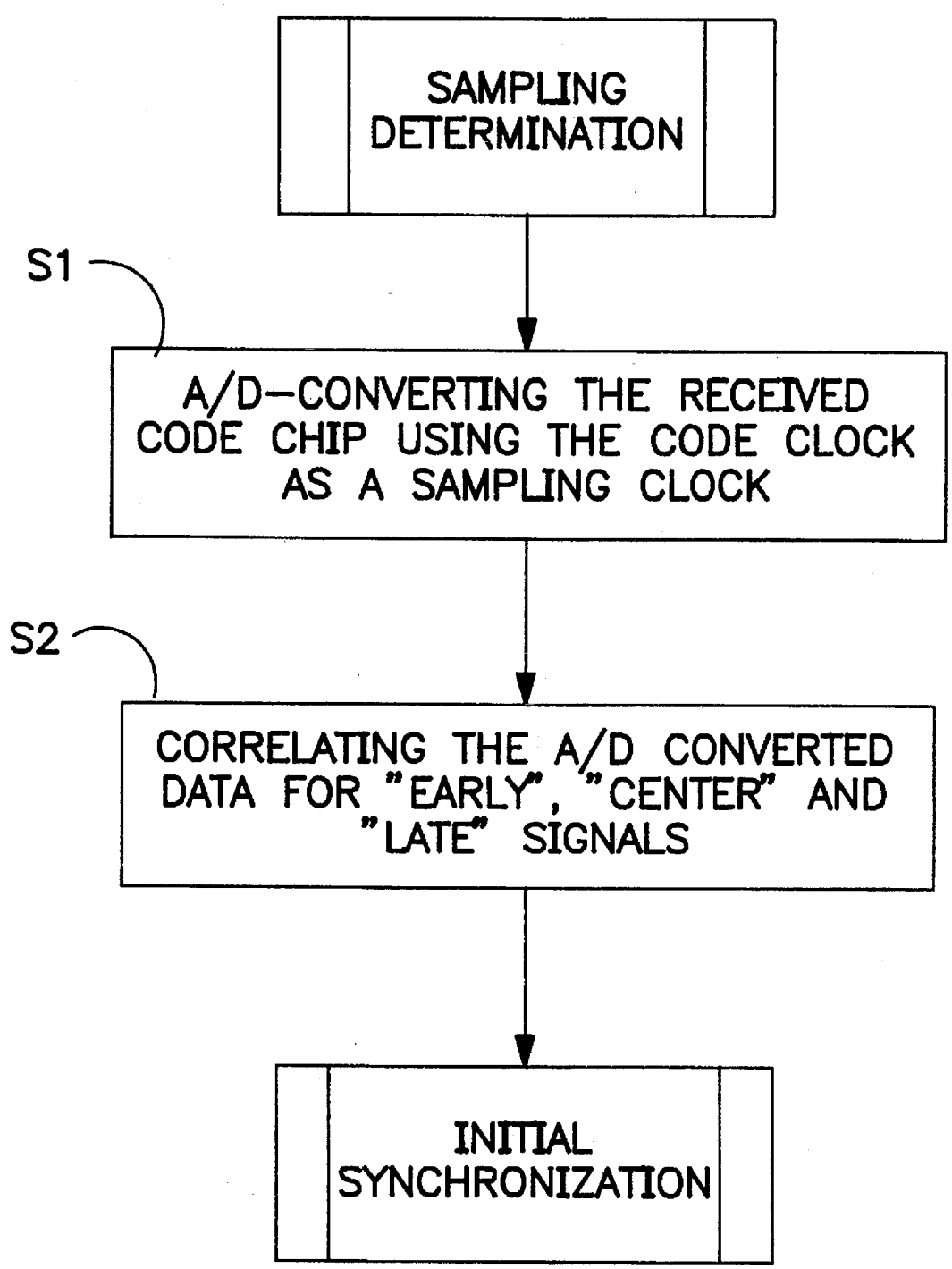
FIG. 10 shows a simplified flow chart illustrating operation of a correlator according to the present invention.

Referring to FIG. 10, the process between sampling determination, and the beginning of initial synchronization is shown. In step S1 analog to digital converters 25 and 26 and clock generator 32 are operated together. In step S2, correlation in at least one of the early, center and late channels is sought in units 41-7 to 41-12 of correlating units 27/28.

(2) initial synchronization

Figure 12:
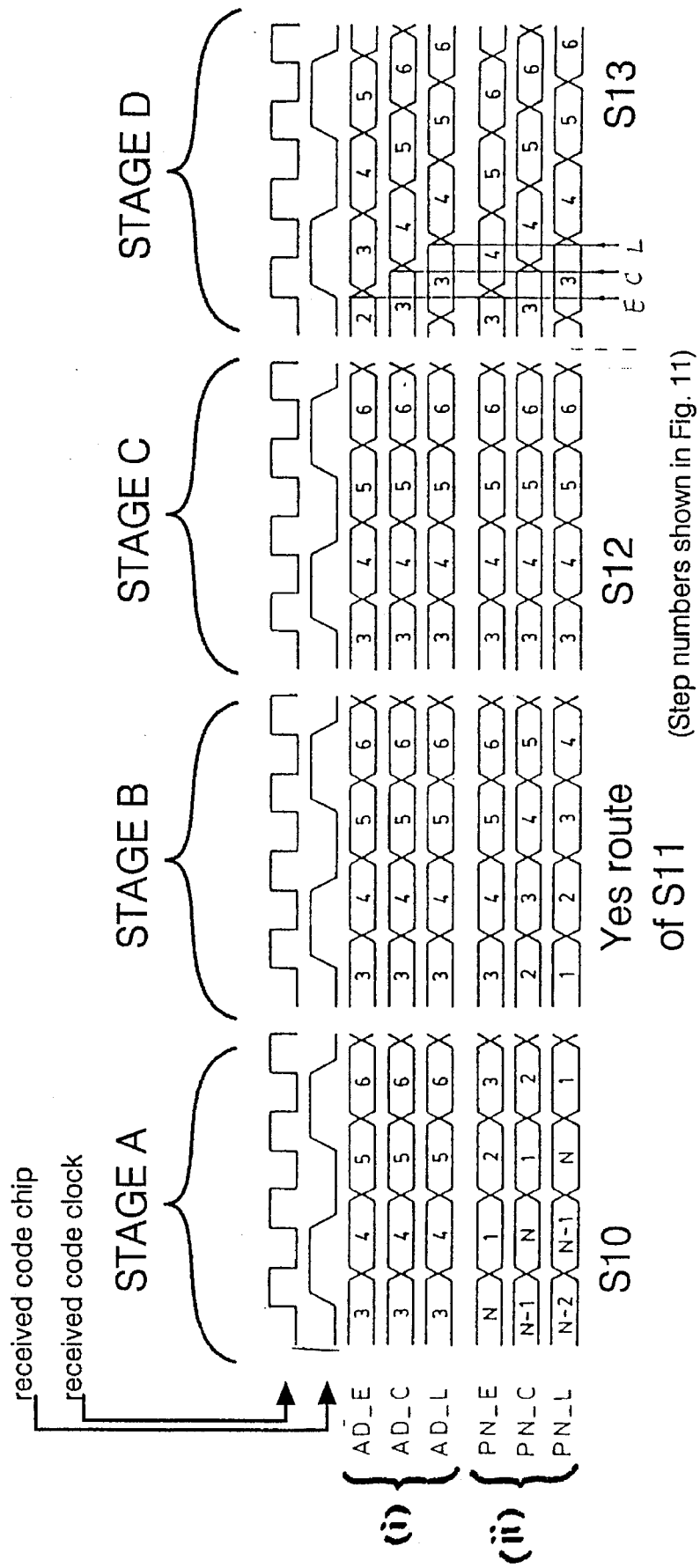
FIG. 12 shows a timing chart of the initial synchronization of FIG. 11.

Referring now to FIG. 12, in the initial synchronization process, early, center and late reference PN codes are generated at times falling within one received code chip. In one embodiment, shown as stage A in FIG. 12, the early reference PN code is at a frequency, and contains a PN code corresponding to a first chip, N, the center reference PN code is at a frequency, and contains a PN code corresponding to the adjacent chip, N-1, and the late reference PN code is at a frequency, and contains a PN code corresponding to the next adjacent chip N-2. If correlation is not detected in stage A, then the reference PN codes in the early, center and late channels are shifted by three chips, as shown in stage B. It will be noted that, in stage B, the output of the early analog to digital converter, AD_E, contains the same chips and the reference PN code, PN_E. This coincidence between the received PN code chip and the reference PN code chip produces a correlation signal in the early channel.

One skilled in the art will recognize, of course, that shifting three chips may not be necessary in some cases. A shift of one chip time or of two chip times may be found to be preferable.

Once correlation is detected in one of the channels (the early channel in the example), then in stage C, the reference PN codes fed to the other two channels is aligned in frequency and PN code with the PN code in the channel showing correlation. That is, the frequency and reference PN code of the early channel are fed also to the center channel and the late channel. This should produce correlation outputs in all three channels.

Figure 9B:
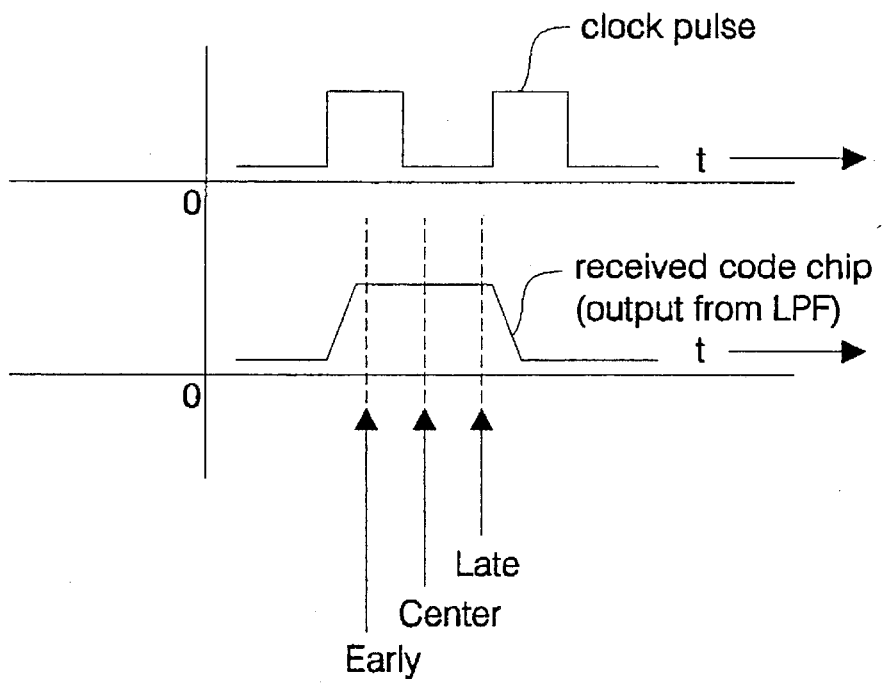

In stage D, the PN code fed to the early channel is displaced in the early direction a time equal to one-third chip from the PN code fed to the center channel. Also, the PN code fed to the late channel is displaced in the late direction a time equal to one-third chip from the PN code fed to the center channel. The total difference between the timing of the early channel and late channel PN codes is two-thirds of a chip. At least the center channel and one of the early and late channels continues to provide correlation. If the other of the early and late channels produces no correlation signal, then the frequency and phase of all three reference PN codes are shifted in time in a direction tending to bring all three channels within one chip. When this process is completed, the situation shown in FIG. 9B results, with all three channels falling within a single chip. If the timing between the received PN code and the reference PN code drifts toward either early or late, when correlation is lost, correction is begun to restore the desired timing.

The time required for initial synchronization of an m-sequence PN code (31 chips in the example embodiment), the maximum time required Tsync for performing the initial synchronization is defined by the following equation (4):

$$\text{Tsync} = 2\alpha\beta N T_{pn} \text{ (sec.)} \ldots \quad (4)$$

where,
N: length of code;
Tpn: period of m-sequence PN code chip;
α: time required for determination; and
β: N/3, (when three adjacent chips are sampled) or 1+(N/3) (when chips are sampled one at a time)

Figure 11:
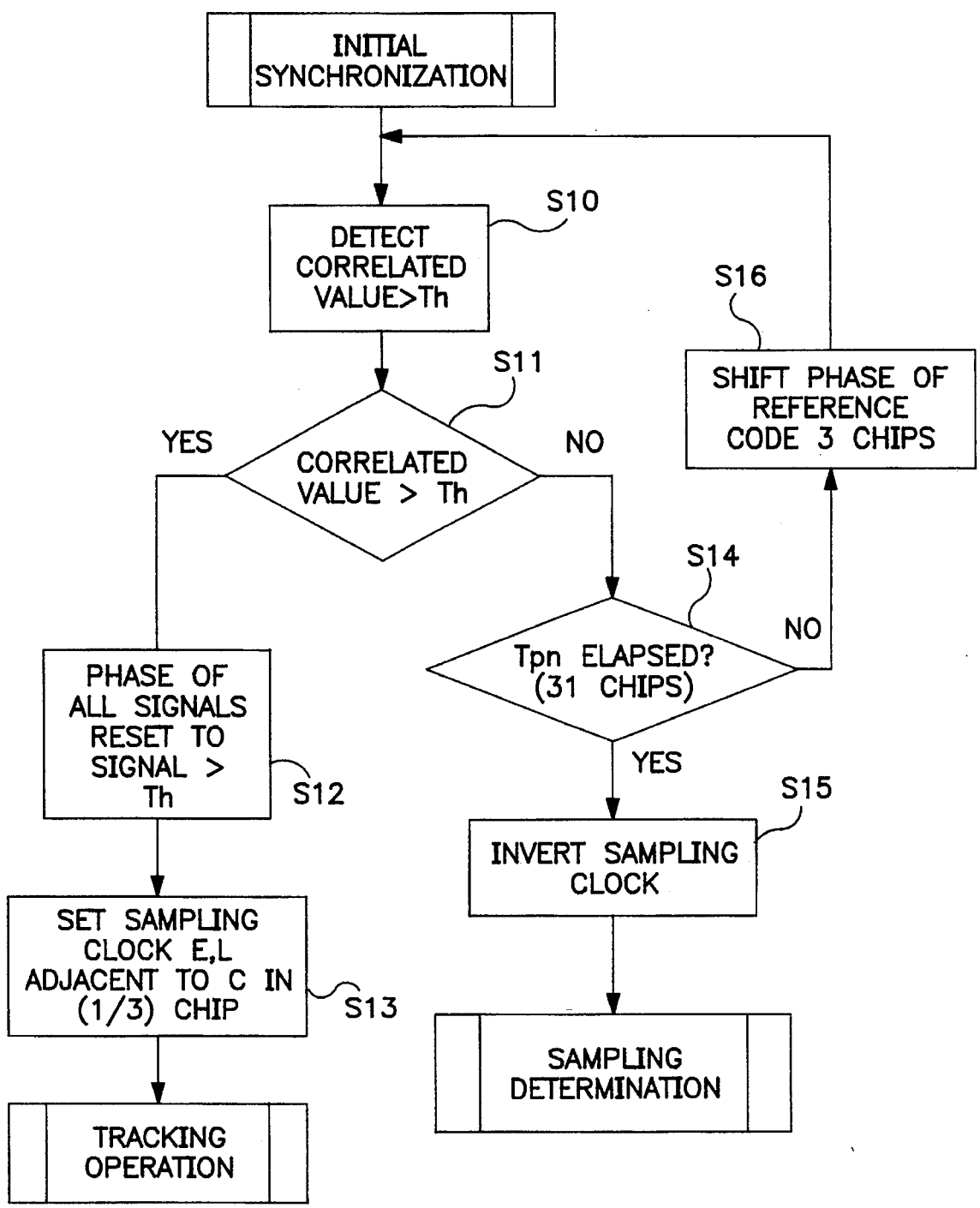
FIG. 11 shows a flow chart illustrating an initial synchronization operation in the process illustrated in the flow chart of FIG. 10.

Referring now to FIG. 11, step S10 in the flow chart represents attempts to detect a correlation value exceeding a threshold value Th. In step S11, if no channel contains a correlation exceeding threshold value Th, the program branches to step S14, where it is determined whether the period of the m-sequence PN code has elapsed. If the period has not elapsed, the phases of the three reference PN codes are shifted by three chips in step S16. If the period has elapsed, the sampling clock is inverted in step S15, and sampling determination is resumed. The inversion of the sampling clock improves the likelihood of attaining initial synchronization, in the manner shown in FIG. 9A.

If a correlation value exceeding threshold value Th is detected in one of the channels in step S11, then in step S12, the phases of the remaining two channels is adjusted to equal the phase of the channel in which correlation is detectrid. Finally, in step S13, the phase of the early channel is shifted onethird chip earlier than the center channel, and the phase of the late channel is shifted one-third chip later than the center channel. This begins the tracking operation discussed above.

(3) tracking operation

After initial synchronization, the received PN code and the reference PN code must be kept synchronized. However, these codes tend to deviate from each other since they are controlled independently by separate clocks, one in the transmitter, and one in the receiver. The tracking operation detects deviation between the received PN code clock and the reference PN code and shifts the phases of the signals fed to correlating units 41-4 to 41-6 one-third chip in response to the output of comparison circuit 42-2. The shifted signals are the reference PN code inputs to A/D-converters 40-1 to 40-6 and the reference code clock from the reference code generating circuit 43-1.

In this tracking operation, one of the early, center and late sampling clock is selected by the clock select circuit 44-2 and the selected clock is fed to the analog to digital converter 25 and reference PN code generator 31 as shown in FIG. 7.

Figure 13:
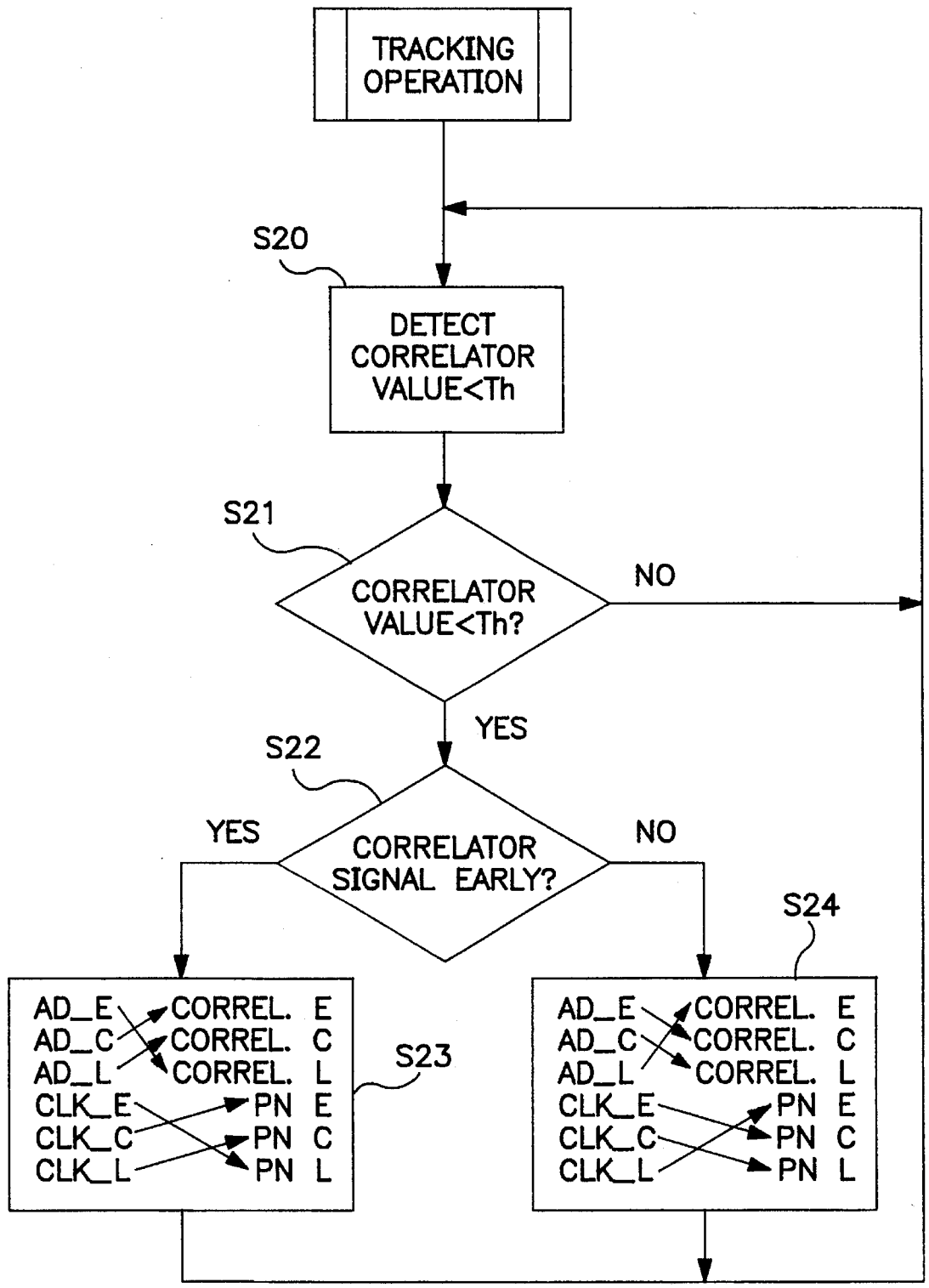
FIG. 13 shows a flow chart illustrating a tracking operation associated with the process illustrated in the flow chart of FIG. 10.

Referring to the tracking flow chart in FIG. 13, step S20 detects whether or not one of the early or late channels has a correlation signal less than a threshold level (indicating that the received PN code and the reference PN code have moved out of alignment). If all channels have correlation signals exceeding the threshold level, in step 21 the program loops back to detecting for a low correlation signal. If the early or late correlation signal is less than the threshold level, step 21 determines whether the low correlation signal originates in the early or late channel. If the low correlation signal originates in the early channel, step 23 is entered. Step 23 performs clockwise cyclic permutation of the early, center and late phases of the signals sent to the analog to digital converters and of the early, center and late clock signals. That is, the early phase signals are inserted into the late channel, and the center and late phase signals are both move to their next higher adjacent phases.

If the late channel is determined by step S22 to have a low correlation level, step S24 performs counterclockwise cyclic permutation of the early, center and late phases of the signals sent to the analog to digital converters and of the early, center and late clock signals.

Figure 14:
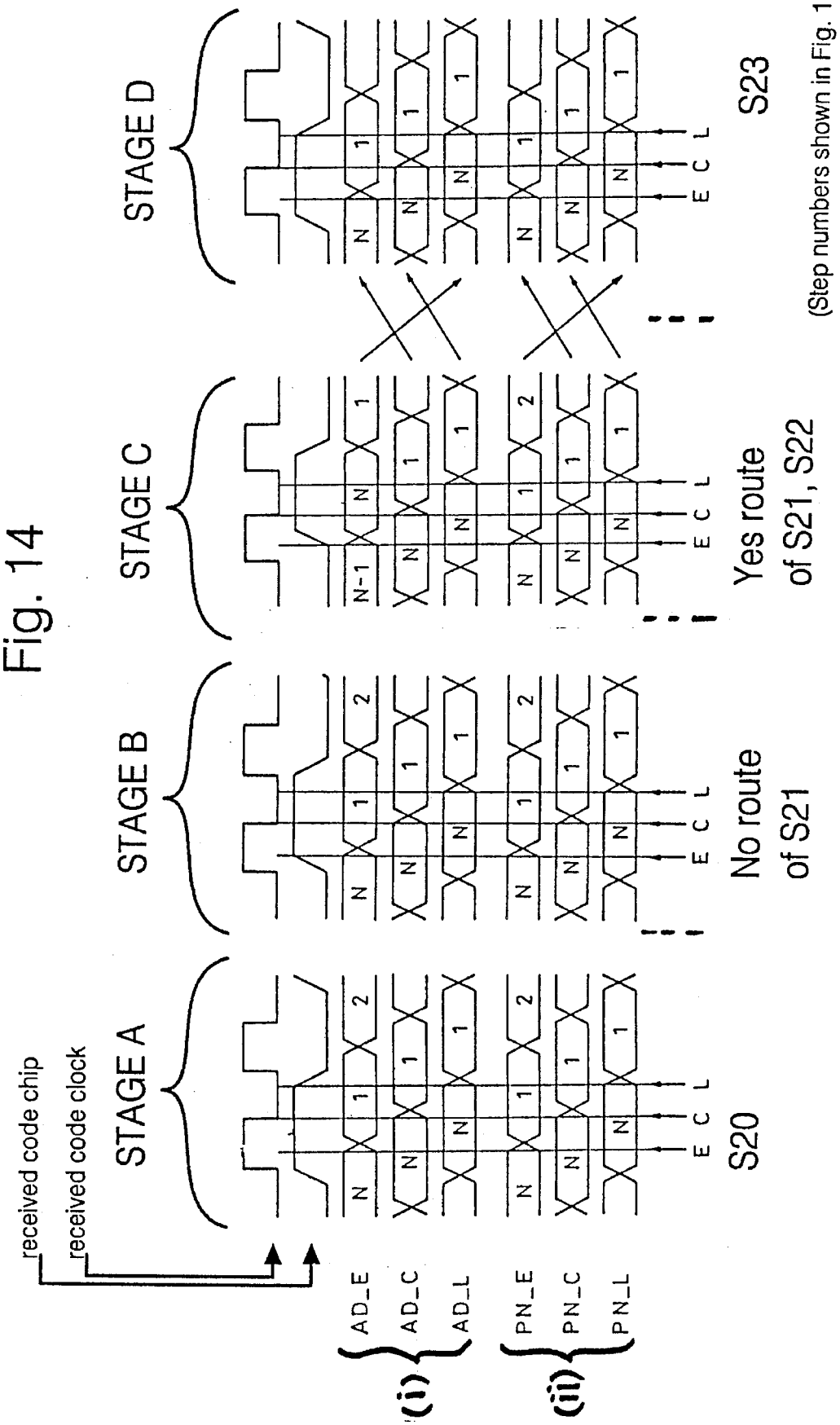
FIG. 14 shows a timing chart of the tracking operation shown in FIG. 13.

Referring now to FIG. 14, the timing chart illustrates the operations defined in the flow chart of FIG. 13. In stages A and B, correlation in all channels exists, although the late channel sampling time is close to the end of the late chip in stage A, and the early channel sampling time is close to the end of the early chip in stage B. Stage C illustrates the case where the early sampling time falls outside the high-amplitude portion of the received chip. This condition is detected by the absence of a correlation signal in the early channel.

Stage D shows the situation after correction by clockwise cyclic permutation of the three reference PN codes and the three clock signals. It will be noted that stage D has restored the early, center and late signal channels to the high-amplitude portion of the received code chip.

If the opposite timing relationships occur, wherein, in stage C, the late sampling time occurs outside the received chip, then opposite cyclic permutation returns all of the early, center and late sampling times to within the chip.

Figure 15A:
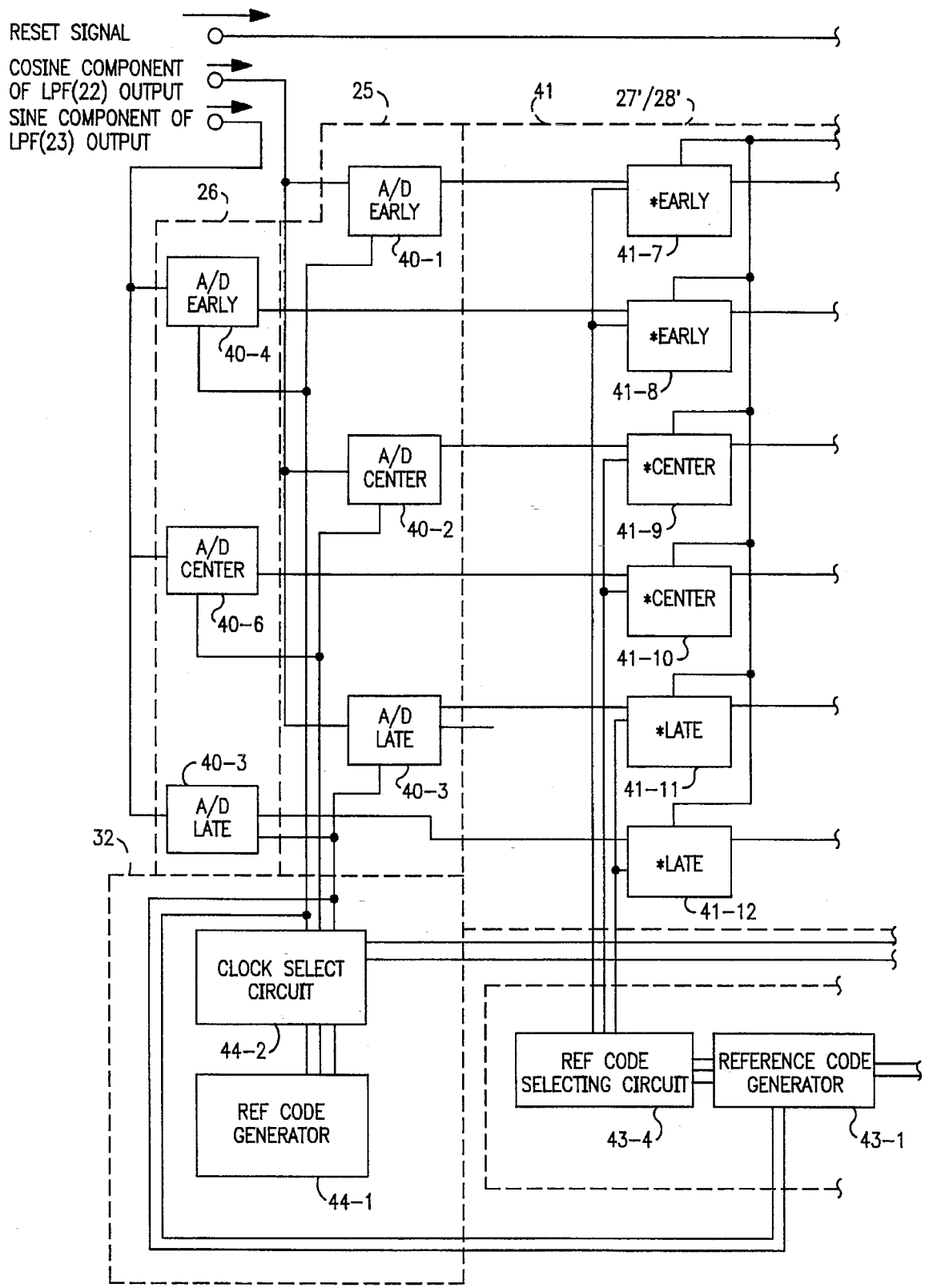
FIG. 15 shows a block diagram of a sliding correlator according to a further embodiment of the present invention.

Referring now to FIG. 15A, a further embodiment of a sliding correlator 24' is similar to sliding correlator 24 of FIG. 7, except that analog to digital select circuits 41-1 to 41-6 are omitted, and their functions are assumed by the addition of a correlated output selecting circuit 42-6 and a status storing memory 42-4a in a controlling circuit 30'. Whereas the output signal in the embodiment of FIG. 7 was always taken from the center channel, in the embodiment of FIG. 15A, the output signal is selected by output selecting circuit 42-6 from whichever channel (early, center or late) provides a correlated signal at a given time. as another embodiment of the present invention.

Tracking circuit 42-4' includes the addition of status storing memory 42-4a for storing the status of relations between the received code clock and the received code chip, described later. Reference PN code generator 31 includes a reference PN code selecting circuit 43-4.

Figure 16:
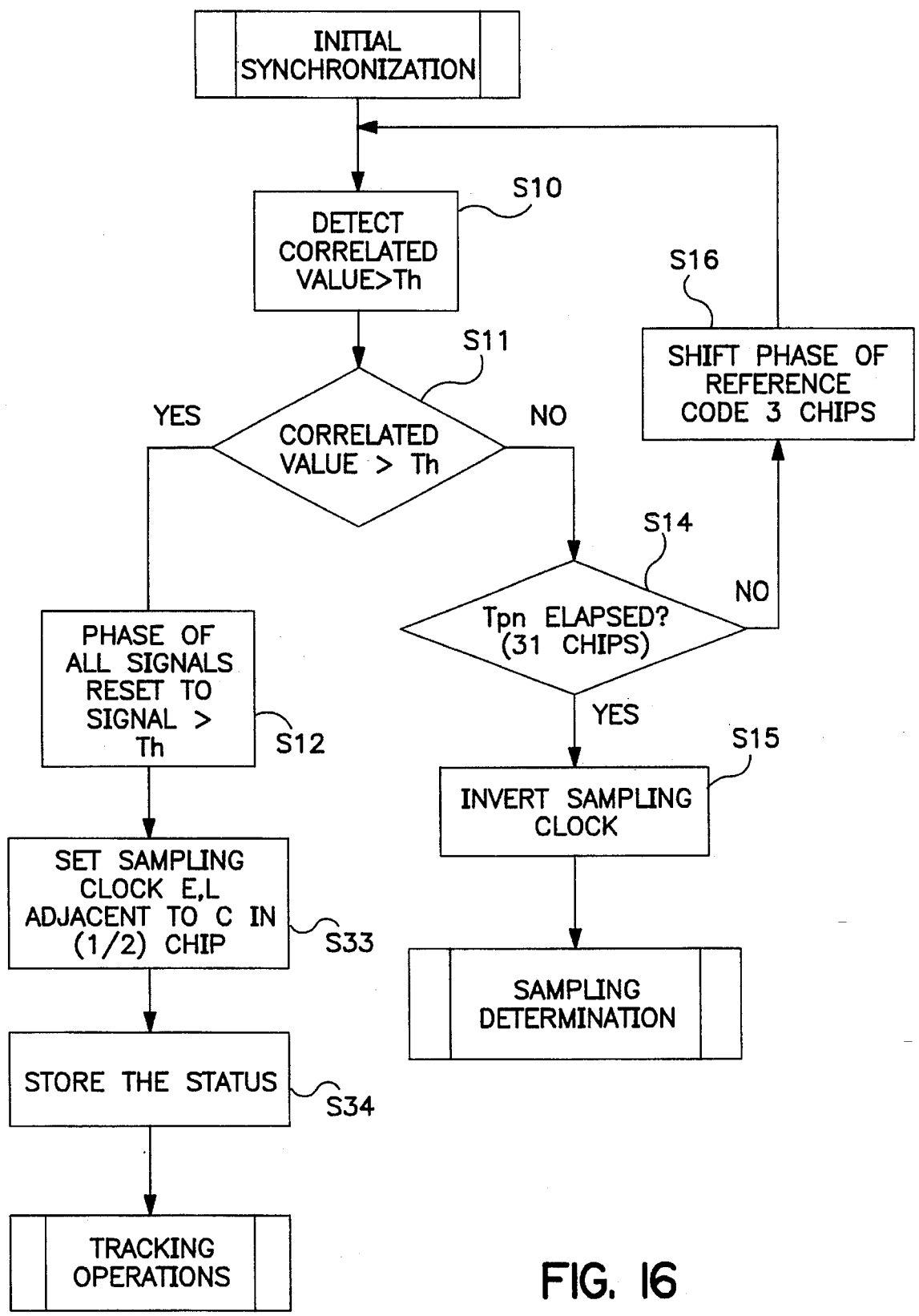
FIG. 16 is a flow chart to showing initial synchronization performed by the sliding correlator of FIG. 15.

Referring now to FIG. 16 the flow diagram of initial synchronization is the same as initial synchronization in the embodiment of FIG. 11, except that step S13 of FIG. 11 is replaced by steps S33 and S34 in FIG. 16. In step S33, after all phases, early, center and late are found to have correlation signals exceeding the threshold Th, then the early and late phases are shifted one-half chip time in opposite directions from the center phase. This guarantees that either the early or late phase will lose its correlation signal. This status is stored in step 34, and tracking begins. Since the remainder of the flow chart of FIG. 16 is identical in function to the flow chart in FIG. 11, described in the preceding, further discussion thereof is omitted.

Figure 15B:
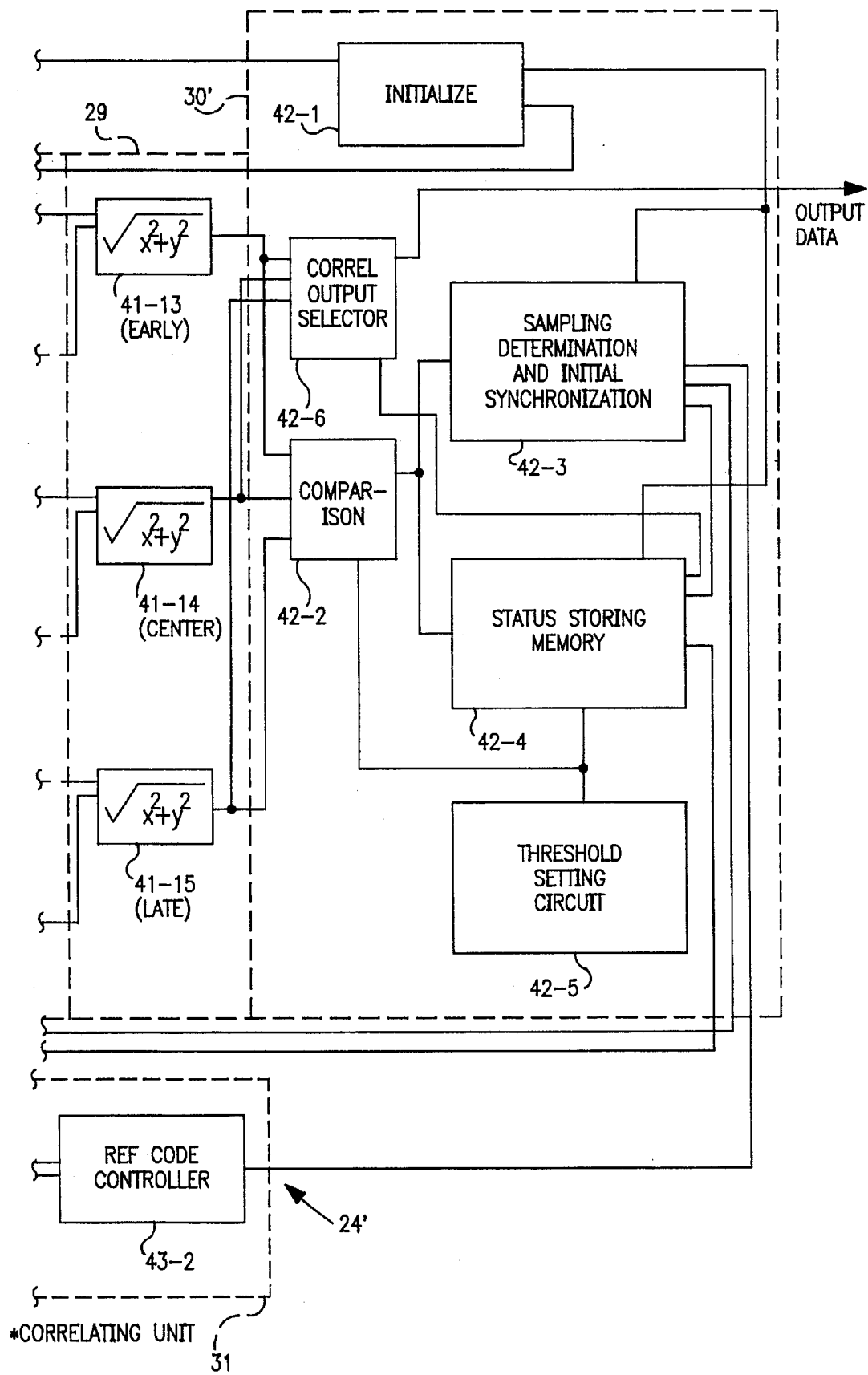
Figure 17:
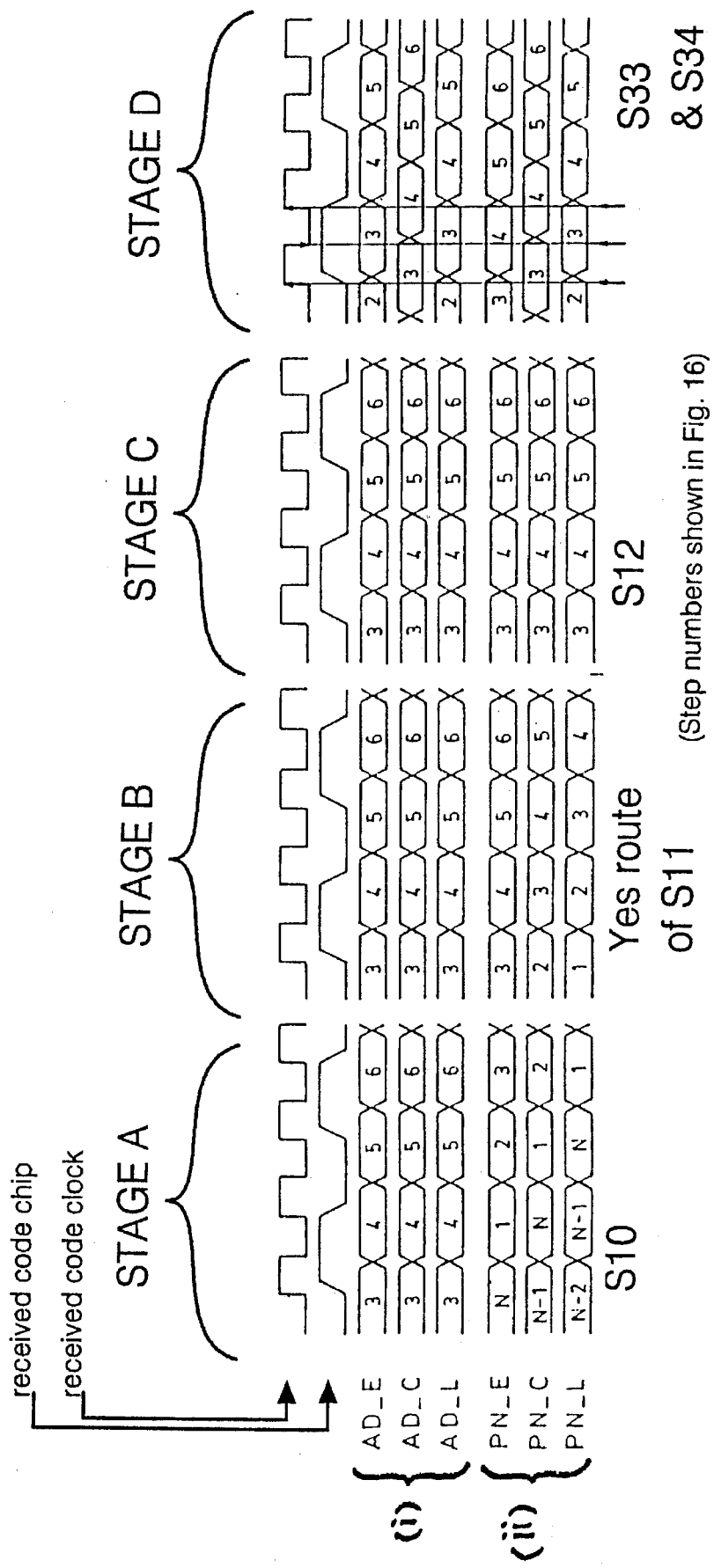
FIG. 17 shows a timing chart of the initial synchronization shown in FIG. 16.

Referring now to FIG. 17, a timing chart of the embodiment of the invention in FIGS. 15 and 16 reveals that stages A, B and C are identical to corresponding stages in the timing diagram of FIG. 12. In stage D of FIG. 17, the early and late phases are displaced one-half chip from the center phase, rather than the one-third chip of FIG. 12.

Referring again to FIG. 15, clock select circuit 44-2 gives the reference code generating circuit 43-1 only two controlling signals corresponding to early and late signals. Accordingly, in order to accurately output signals, reference PN code generator 31 requires a way to recognize the relation between the received PN code and the reference PN code.

Status storing memory 42-4a stores three flags, an early flag, a center flag and a late flag. These flags are used in the tracking operation described below.

Referring now to FIG. 19B, the three conditions encountered during tracking, and the corresponding status of the three flags is shown. In the condition shown in part a of FIG. 19B, the late sampling time is outside the received chip, while the early and center sampling times are within the received chip. This produces a flag status of 110, indicating that the tracking operation must be shifted in the early direction. In part b of FIG. 19B, only the center sampling time is within the high-amplitude portion of the received chip, while the early and late sampling times are outside the high-amplitude portion of the received chip. The flag status is 010. The flag status of 010 is the ideal, indicating correct tracking without the need for correction. In part c of FIG.

19B, the early sampling time is outside the received chip while the center and late sampling times are within the received chip. This yields a flag status of 011, indicating the need for adjusting the phase of the reference PN code generator 31 and clock generator 32 toward the early direction.

Figure 18:
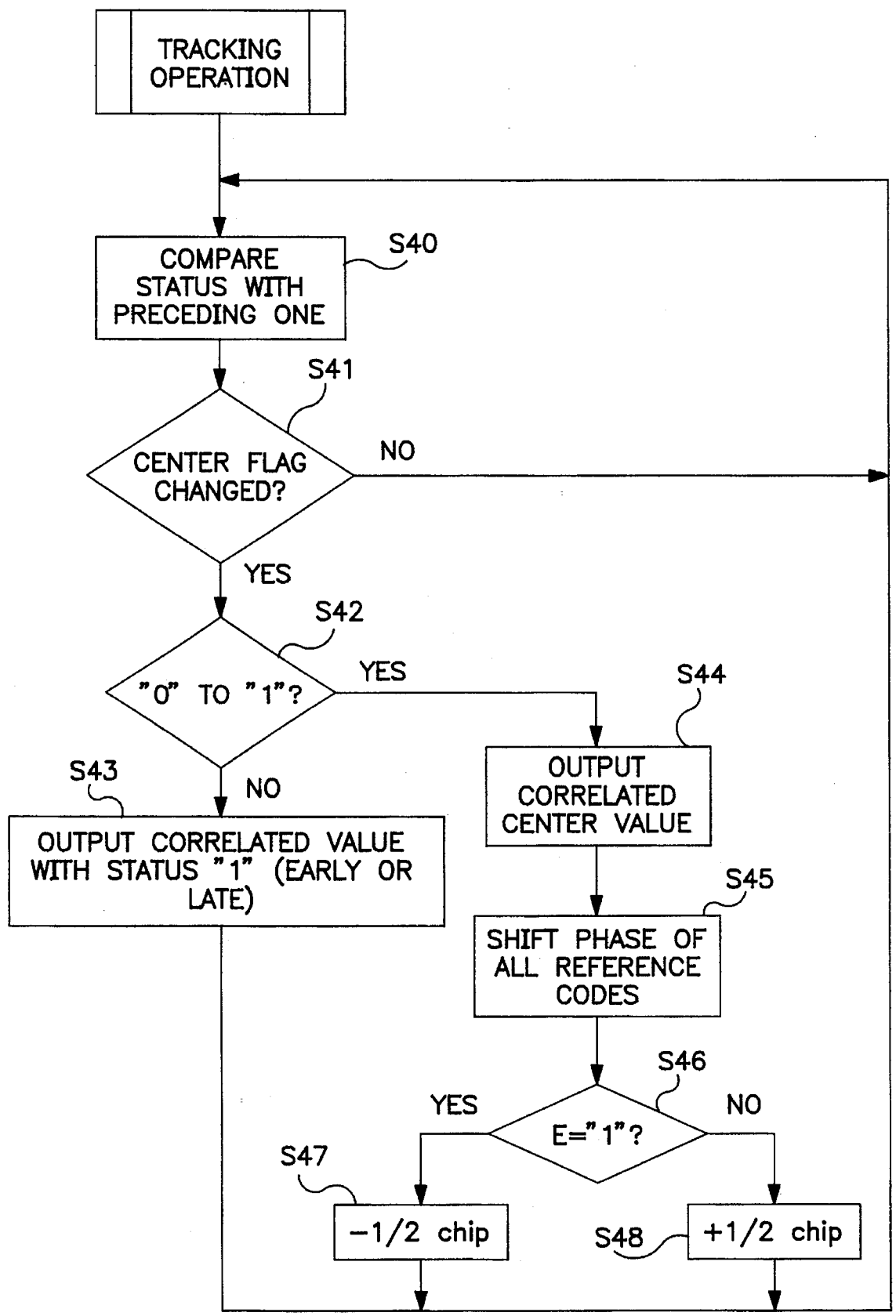
FIG. 18 shows a flow chart illustrating a tracking operation performed by the sliding correlator shown in FIG. 15.

Referring now to FIG. 18, the tracking operation of the sliding correlator 24' is traced. In step S40, the flag status is compared with the preceding flag status. In step S41, if the status of the center flag is not changed, the flow returns to the beginning. Step S42 determines whether the center flag status has changed from 0 to 1, or from 1 to 0. If the status of the center flag has changed, from 1 to 0 (i.e. it has not changed from 0 to 1), then step S43 outputs the correlated value from whichever of early and late phases has correlation, as determined from the status flags. If the status of the center flag has changed from 0 to 1, then step S44 selects the correlated value of the center for output. Step S45 commands shifting of the reference PN code, and the reference clock signals. Step S46 determines whether the early flag is 1. If it is, step S47 subtracts one-half chip from the timing of the reference PN code and the reference clock fed to the center channel. If the early flag is 0 (not 1), step S48 adds one-half chip to the reference PN code and the reference clock fed to the center channel.

Referring now to FIG. 19A, the timing relationships for three status flag conditions, 011, 001 and 110 are shown in stages A, B and C, respectively.

Figure 20:
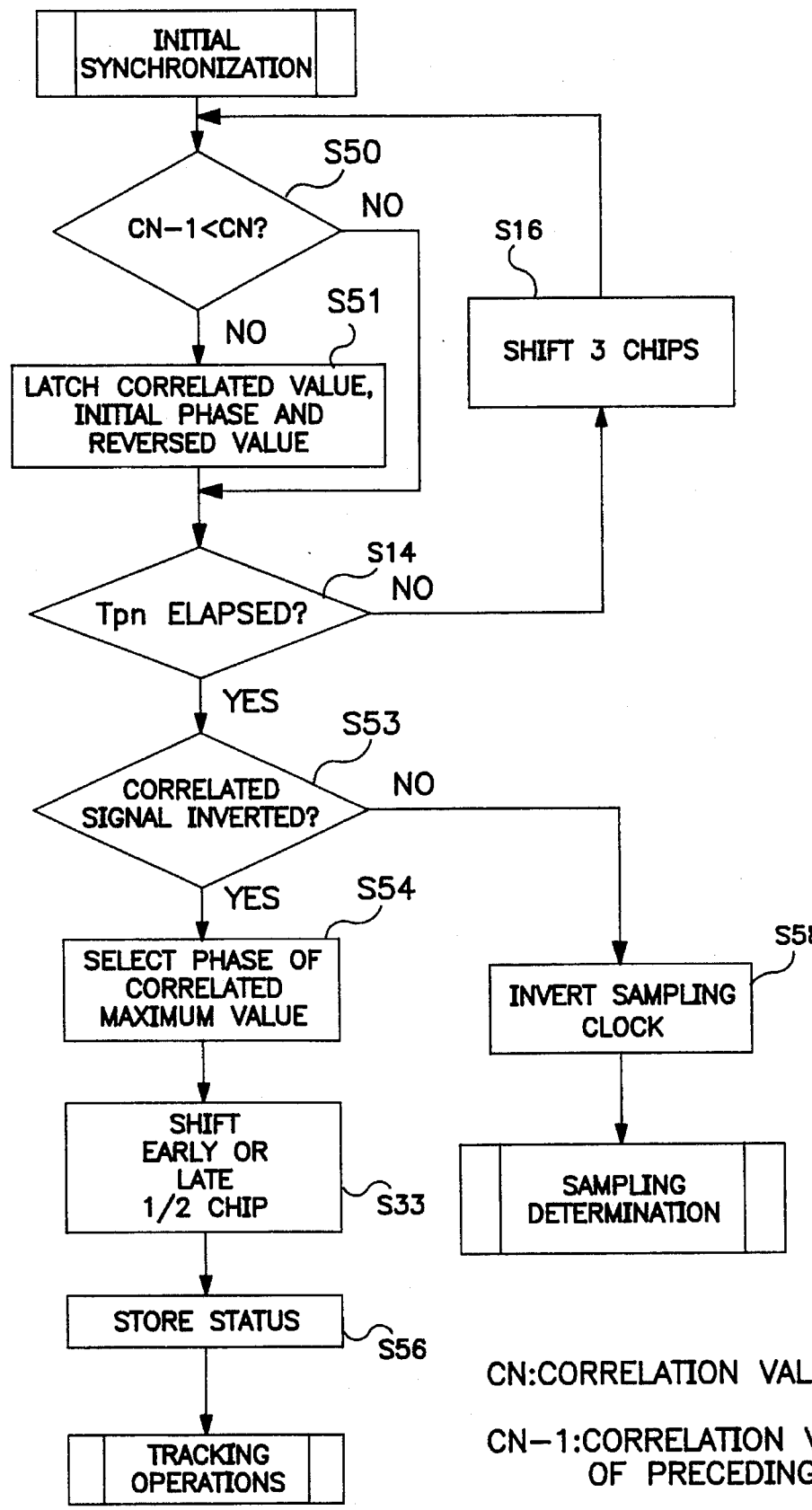
FIG. 20 shows a flow chart illustrating another initial synchronization operation performed by the sliding correlator shown in FIG. 15.
Figure 20A:
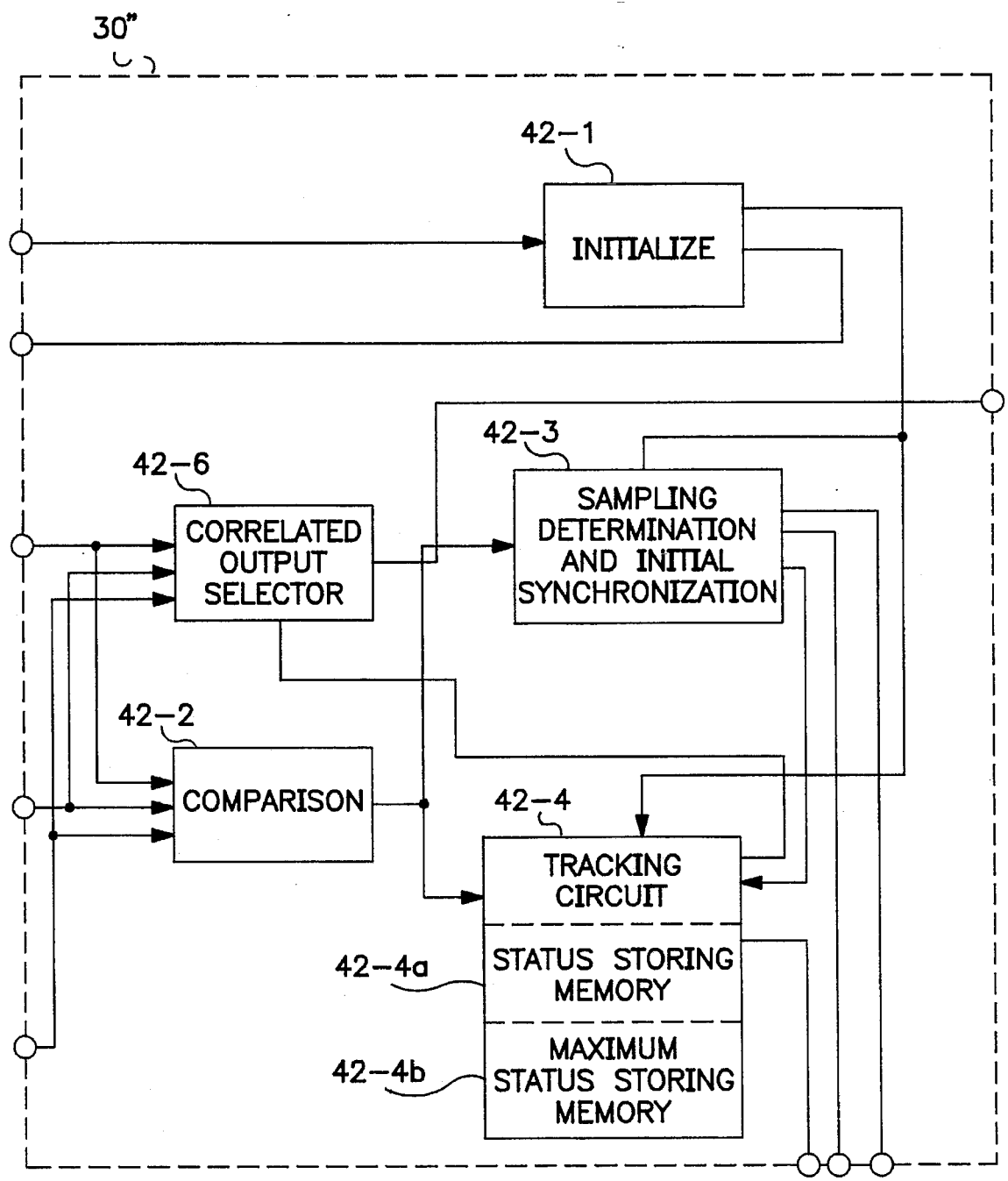
FIG. 20A shows a block diagram illustrating a controlling block of the sliding correlator according to the present invention by which an initial synchronization and a tracking operation are performed based upon a maximum correlation value instead of a threshold value.

Referring now to FIG. 20A controlling circuit 30" is the same as controlling circuit 30' of FIG. 15, except for the addition in a tracking circuit 42-4 of a maximum status storing memory 42-4b. In this embodiment, the correlated output having the highest amplitude (early, center or late) is selected for output by correlated output selecting circuit 42-6, based on the stored maximum status in maximum status storing memory 42-4b. Since the highest-amplitude correlated signal is selected for output, comparison of correlated signals with a threshold is not required.

Referring now to FIG. 20, initial synchronization of embodiment of FIG. 20 is shown, in which steps S50 and S51 identify the phase having the maximum correlated signal, and latch the identification of this phase into step S51. Steps S14 and S16 perform the same shifting functions as their corresponding elements in preceding flow charts.

Step S53 determines whether or not a correlated signal has been found. If NO, step S58 inverts the clock and leads to sampling determination. If YES, step S54 selects the phase having the maximum correlated value. Step S33 shifts the phases of the early and late channels one-half chip earlier and later, respectively as indicated previously. Step S56 stores the status, indicating which channel contains the highest-amplitude correlation signal. Tracking operation begins.

Figure 22:
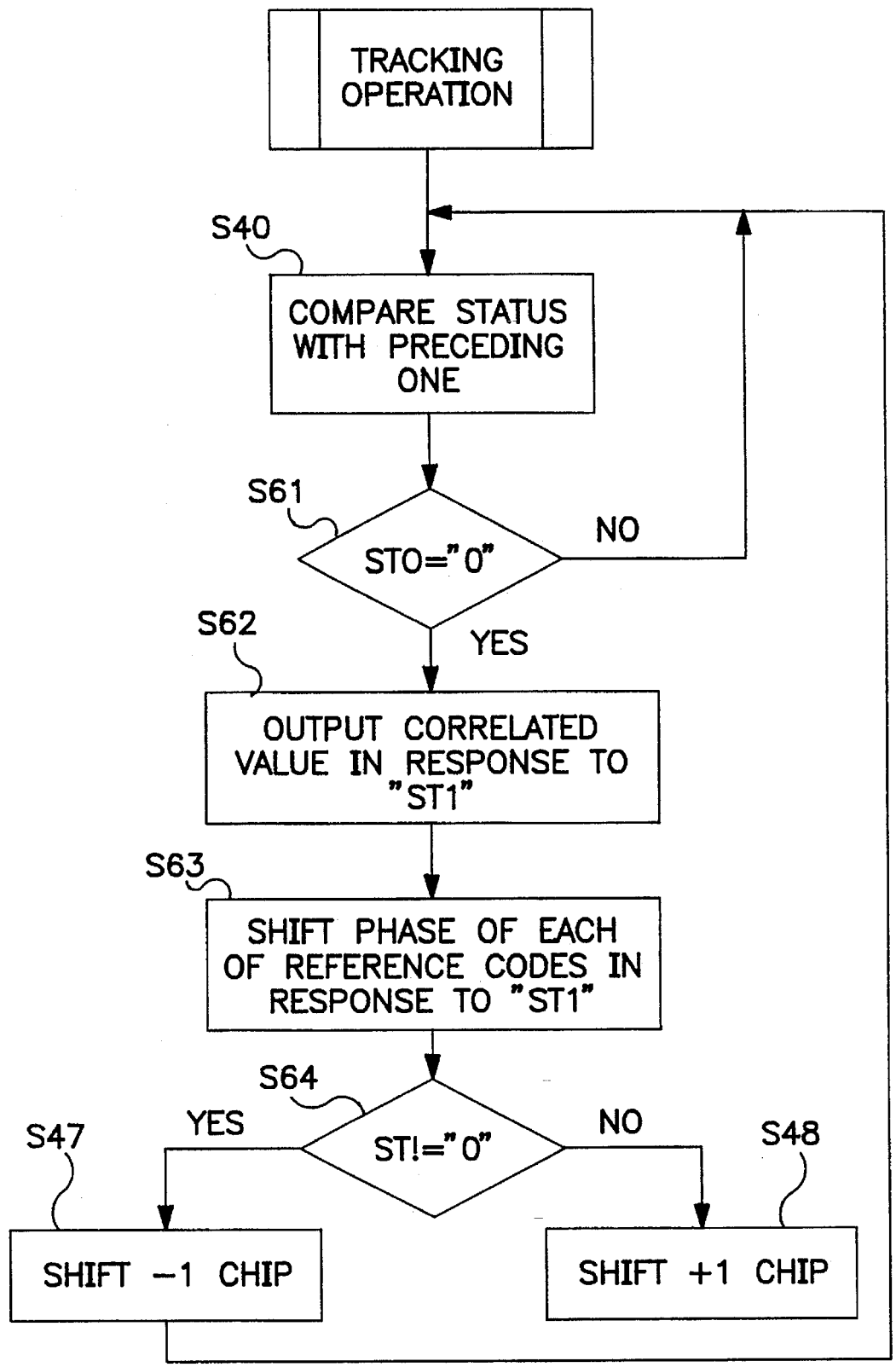
FIG. 22 shows a flow chart illustrating another tracking operation performed by the sliding correlator shown in FIG. 15.
Figure 23:
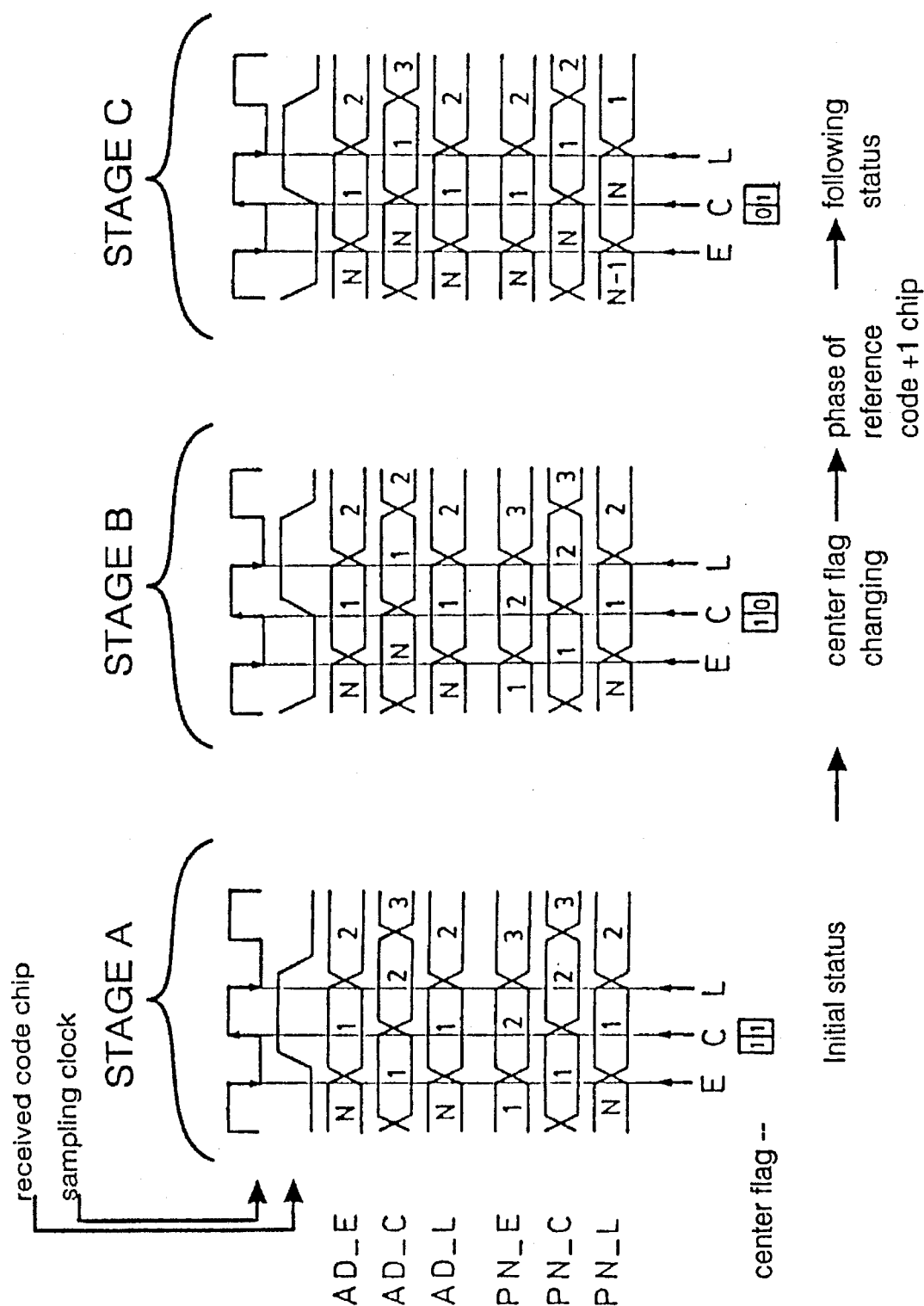
FIG. 23 shows a timing chart of the tracking operation shown in FIG. 22.

FIGS. 22, 23 show a flow chart and a timing chart of another tracking operation by the correlator shown in FIG. 15. In this operations, the maximum correlated value, of whatever channel has the highest amplitude, is used for determining the phase to be controlled instead of the value above the threshold value.

In the embodiments in which a threshold is used for determining the code whose phase is to be changed, accurate initial synchronization and tracking operation may fail if any of the three correlated value is less than the threshold value. For example, reduced S/N (Signal to Noise ratio) due to fading may render correlation impossible in one or more channels. In he embodiment of FIGS. 22 and 23, the phases of the codes are shifted in accordance with whichever phase exhibits the maximum correlated value, regardless of the amplitudes of the correlated signals. Thus, even if one or two channels produces a very low-amplitude, or zero-amplitude, correlated signal (correlated value not detected), as long as one channel produces a detectable correlated value, processing can be performed. The identity of the channel containing the maximum correlated value is stored in maximum status storing memory 42-4b. As shown in the timing chart of FIG. 23, the contents of the maximum status storing memory is changed in accordance with the relation between the received code clock and the reference code clock.

In the tracking operation, step S40 determines whether of not a change in status has occurred since the last determination time. If a change has occurred, step S61 tests to see whether either early or late channels contain the maximum correlated value. The value ST0 in step S61 is set to 0 if the center channel is highest, and operation loops to the beginning. The value ST0 in step S61 is set to 1 if either the early or late channel is highest, and operation continues in step S62. Step S62 determines which of the early and late channels has the highest-amplitude correlated value. The value ST1 is set to 1 if the late channel is highest, and is set to 0 if the early channel is highest. In step S63, the phase shift required in response to the value of ST1 is determined. In step S64, if ST1=1, step S47 sets the status register to E=1f and L=0, and shifts the reference PN code and the reference clock −1 chip. In step S64, if ST1=0, step S47 sets the status register to E=0 and L=1.

The timing chart of FIG. 23, together with the two-bit status register conditions along the bottom, further illustrate this embodiment.

Figures 24, 25:
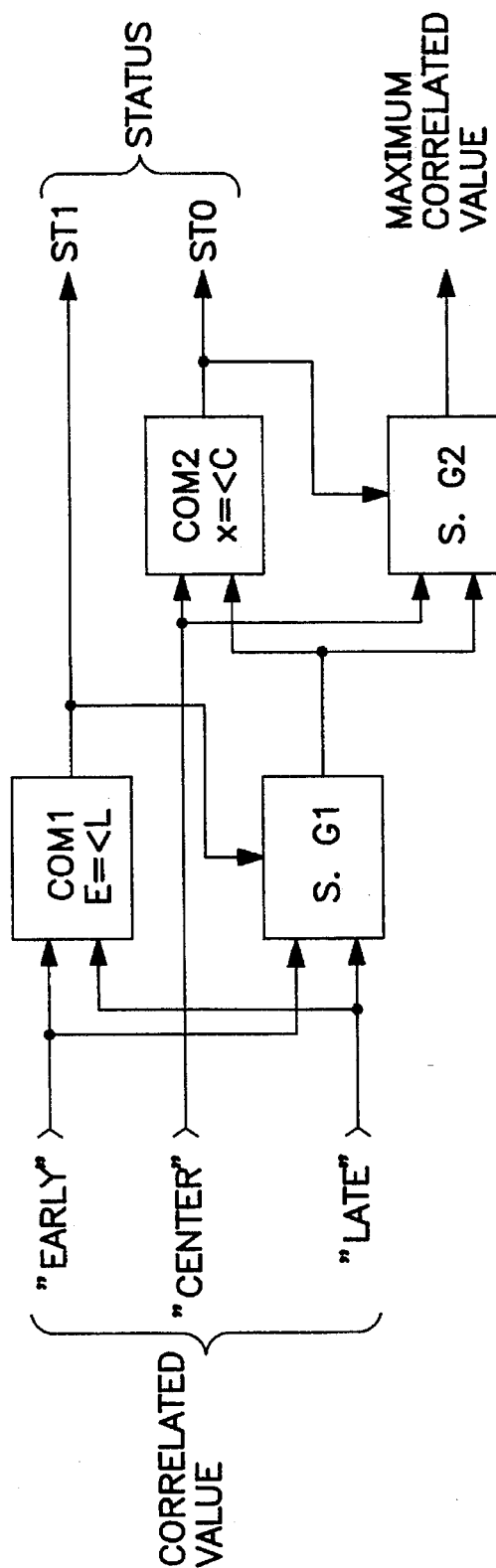
FIG. 24 shows a block diagram for detecting a status.
FIG. 25 is table showing relationships among detected status, the maximum correlation value, and phase of the reference PN code.

FIGS. 24 and 25 show a block diagram and a table of relations for one embodiment of a method for detecting the status using a pair of steering gates SG1 and SG2 and a pair of comparators COM1 and COM2. In the table shown in FIG. 25, the character "x" means unnecessary, "NOP" means no-operation and symbols "+" or "−" means advance or delay of the phase.

As described above, by employing the correlator concept according to the present invention, a digital sliding correlator achieves sampling determination, initial synchronization and tracking without requiring a digitized VCO.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sliding correlator comprising:

means for detecting a sine component and a cosine component of an input signal;

means for digitizing the sine and cosine component to produce sine and cosine digitized components;

means for generating a reference PN code, frequency of the PN code being similar tot hat of the input signal;

means for determining a correlation between the digitized sine and cosine components output from the digitizing means and sine and cosine components of the reference PN code generated by the reference PN code generating means, the determining means comprising both a first correlating unit for determining a correlation between the digitized sine component and the sien component of the generated reference PN code and a second correlating unit for determining a correlation between the digitized cosine component and the cosine component of the generated reference PN code;

means for generating at least three clock signals and outputting a desired one for use in the means for digitizing and means for generating a reference PN code, each of the at least three clock signals having a predetermined frequency, and phases of the clock signals being deviated a predetermined amount from each other, whereby the reference PN code generating menas being capable of generating at least three PN codes; and means for controlling an output signal to be output from the sliding correlator by selecting one of the clock signals in accordance with an output of the means for determining a correlation, the controlling means being designed to output a control signal.

2. The sliding correlator according to claim 1, wherein said means for controlling includes means for comparing a characteristic of said at least first and second correlation signals.

3. The sliding correlator according to claim 1, wherein said means for controlling includes storing means for storing data regarding positional relationships between said reference PN code and the generated first and second clock signals.

4. The sliding correlator according to claim 1, wherein the determining means comprises a pair of correlating units, one on which determines a correlation between the digitized sine component and the sine component of the generated reference PN code, the other of which determines another correlation between the digitized cosine component and the cosine component of the generated reference PN code.

5. Apparatus adapted to be positioned in a sliding correlator for synchronizing a transmitted PN code with a reference PN code to be generated therein, frequency values of the transmitted PN code and the generated reference PN code being substantially the same with each other, comprising:

means for generating first, second and third reference PN codes;

the first, second and third reference PN codes including transmitted PN code;

the first, second and third reference PN codes being displaced in phase from each other;

means for checking whether one of correlated values of the reference PN codes exceeds a predetermined threshold value; and means for shifting in phase each of the reference PN codes a predetermined value to the correlated one.

6. Apparatus according to claim 5, wherein:

said second reference PN code is a center reference PN code;

said first reference PN code is any early reference PN code; and said third reference PN code is a late reference PN code.

7. Apparatus according to claim 5, wherein:

said transmitted PN code includes chips:

said reference PN code includes chips; and said predetermined amount includes one-third chip.

8. Apparatus according to claim 5, wherein:

said transmitted PN code includes chips:

said reference PN code includes chips; and said predetermined amount includes one-half chip.

9. Apparatus according to claim 5, wherein:

said transmitted PN code includes chips;

said reference PN code includes chips; and said predetermined amount includes one chip.

10. The apparatus according to claim 5, which further comprises time measuring means for measuring a predetermined period in case that none of correlated value of the reference PN codes exceeds the predetermined threshold values; and another shifting means for shifting all the reference PN codes another predetermined value in case that the predetermined period does not elapse.

11. The apparatus according to claim 10, which further comprises inverting means for inverting a phase of a sampling clock pulse to be used for generating the PN codes in case that the predetermined period elapses.

12. Apparatus for tracking a transmitted PN code with a reference PN code, frequency values of the transmitted PN code and the reference PN code being substantially the same with each other, comprising:

means for producing first, second and third reference PN codes displaced in phase a predetermined amount from each other based upon a clock signal to be selected and output by a clock signal generating unit arranged to generate a plurality of clock signals, the frequencies of said first, second and third reference PN codes are the same as each other and the phases of said first, second and third reference PN codes are deviated a predetermined amount from each other;

means for detecting first, second and third correlation signals relating to a degree of correlation between the transmitted PN code and the first, second and third reference PN codes, respectively; and means for adjusting phase of the first, second and third reference PN codes to track the transmitted PN code in case that a predetermined condition regarding the correlated value is satisfied.

13. Apparatus according to claim 12 wherein:

said transmitted PN code includes chips;

said predetermined amount includes one-third chip; and said adjusting being effective to urge said first, second and third reference PN codes into alignment with a single chip.

14. Apparatus according to claim 12 wherein said means for adjusting includes means for producing cyclic permutation of said first, second and third reference PN codes.

15. Apparatus according to claim 12 wherein:

said transmitted PN code includes chips;

said predetermined amount includes one-half chip; and said adjusting being effective to urge said second and at least one of said first and third reference PN codes into alignment with a single chip.

16. The apparatus according to claim 12, wherein the condition is based upon the maximum correlated value obtained by the detecting means.

17. The apparatus according to claim 12, wherein said predetermined condition is in that one of correlated values of the reference PN codes exceeds a predetermined threshold value.

18. Apparatus for tracking a transmitted PN code with a reference PN code based upon a cloak signal to be selected and output by a clock signal generating unit arranged to generate a plurality of clock signals and output a desired one, frequency values of the transmitted PN code and the reference PN code being substantially the same with each other, comprising:

the transmitted PN code including at least one chip;

means for producing first, second and third reference PN codes;

means for detecting a correlation between the transmitted PN code and the first, second and third reference PN codes to produce first, second and third correlation signals respectively;

the first reference PN code being displaced one chip in a first direction from the second reference PN code;

the third reference PN code being displaced one chip in a second direction from the second reference PN code;

means responsive to an amplitude of the first correlation signal exceeding the second correlation signal for shifting the first, second and third reference PN codes a predetermined fraction of a chip in the first direction; and means responsive to an amplitude of the second correlation signal exceeding said second correlation signal for shifting the first, second and third reference PN codes the predetermined fraction of a chip in the second direction.

19. Apparatus according to claim 18, wherein said predetermined fraction includes one chip.

20. A sliding correlator used in a spread spectrum receiver for determining correlation between a first PN code having a predetermined frequency value input into the receiver and a second PN code whose frequency value is the same as that of the first PN code generated in the receiver, a correlating operation of the correlator including an initial synchronizing step and a tracking step comprising:

correlating means for correlating a part of the first PN code and a part of the second PN code;

initial synchronizing means for initially synchronizing the first and second PN codes;

detecting means for detecting deviation between the synchronized first and second PN codes; and tracking means for tracking the second PN code with the first PN code by changing phase of the second PN code.

21. The sliding correlator according to claim 20 wherein the second PN code is generated based upon a pair of clock signals, each phases of which are inverted with each other.

22. The sliding correlator according to claim 20, wherein the second PN code is generated based upon three clock signals, each phases of which are deviated a predetermined amount from each other.

23. The sliding correlator according to claim 20, wherein the tracking operation of the tracking means is based upon the maximum correlated value obtained from the correlation performed by the correlating means.

24. The sliding correlator according to claim 20 wherein the tracking operation is performed when the correlated value exceeds a predetermined threshold value.

\* \* \* \* \*